US012780344B2

(12) United States Patent
Gu

(10) Patent No.: US 12,780,344 B2
(45) Date of Patent: Nov. 3, 2026

(54) COMPRESSION RING OF BICYCLE HEADSET AND BICYCLE FRAME HAVING THE SAME

(71) Applicant: TIEN HSIN INDUSTRIES CO., LTD., Taichung (TW)

(72) Inventor: Fong-Syuan Gu, Taichung (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 522 days.

(21) Appl. No.: 18/452,559

(22) Filed: Aug. 21, 2023

(65) Prior Publication Data

US 2024/0425134 A1 Dec. 26, 2024

(30) Foreign Application Priority Data

Jun. 21, 2023 (TW) ................................ 112123468

(51) Int. Cl.
*B62J 45/00* (2020.01)
*B62K 21/06* (2006.01)
*F16D 1/08* (2006.01)

(52) U.S. Cl.
CPC ............... *B62J 45/00* (2020.02); *B62K 21/06* (2013.01); *F16C 2326/26* (2013.01); *F16D 1/0864* (2013.01)

(58) Field of Classification Search
CPC .. B62J 45/00; B62J 50/00; B62J 99/00; F16D 1/0864; F16C 2326/26; F16B 2200/00
(Continued)

(56) References Cited

U.S. PATENT DOCUMENTS 2,491,976 A * 12/1949 Hauser ................. B26D 7/2621 83/665
2015/0259022 A1* 9/2015 Nago ..................... B62K 21/12 74/551.1
(Continued)

FOREIGN PATENT DOCUMENTS

CN 203666888 U 6/2014
CN 215622488 U 1/2022
(Continued)

OTHER PUBLICATIONS

Search Report for TW112123468, Issued on Apr. 22, 2024, Total of 2 page.
(Continued)

*Primary Examiner* — Jacob D Knutson
*Assistant Examiner* — Mitchell James Price
(74) *Attorney, Agent, or Firm* — Apex Juris, pllc; Hilde M. L. Coeckx

(57) ABSTRACT

A compression ring of a bicycle headset includes an annular body including a through hole, a large-diameter portion, and a small-diameter portion. The large-diameter portion and the small-diameter portion surround the through hole and are connected with each other. The annular body has a cable guiding hole passing through the large-diameter portion and the small-diameter portion. The present disclosure further provides a bicycle frame including a headtube, the compression ring disposed on an end of the headtube, and a bearing. The annular body enters headtube through the small-diameter portion. An outer diameter of the large-diameter portion is larger than a diameter of the headtube. The large-diameter portion abuts against an end opening of the headtube. The cable guiding hole communicates with the headtube. In this way, the compression ring could save the assembling cost, so
(Continued)

that the compression ring could be quickly installed on the headtube.

13 Claims, 22 Drawing Sheets

(58) Field of Classification Search
USPC ........................................................ 280/288.4
See application file for complete search history.

(56) References Cited

U.S. PATENT DOCUMENTS

| | | | | |
|---|---|---|---|---|
| 2022/0204118 | A1* | 6/2022 | King | B62J 11/13 |
| 2023/0068536 | A1* | 3/2023 | Anderer | B62J 11/10 |
| 2024/0300611 | A1* | 9/2024 | Breitfeld | B62K 21/06 |

FOREIGN PATENT DOCUMENTS

| | | | | |
|---|---|---|---|---|
| DE | 102018006153 | A1 * | 2/2020 | B62J 11/10 |
| EP | 4180310 | A1 * | 5/2023 | B62K 21/06 |
| GB | 2494714 | A * | 3/2013 | B62J 11/13 |
| TW | 202043088 | A | 12/2020 | |
| TW | 202122300 | A | 6/2021 | |

OTHER PUBLICATIONS

English Abstract for TW202122300A, Total of 1 page.
English Abstract for TW202043088A, Total of 1 page.
English Abstract for CN203666888U, Total of 1 page.
English Abstract for CN215622488U, Total of 1 page.

* cited by examiner

COMPRESSION RING OF BICYCLE HEADSET AND BICYCLE FRAME HAVING THE SAME

BACKGROUND OF THE INVENTION

Technical Field

The present disclosure relates generally to a bicycle component, and more particularly to a compression ring of a bicycle headset and a bicycle frame having the same.

Description of Related Art

In order to install a cable routing mechanism on a conventional bicycle headset, a bicycle cable firstly passes through a cable routing groove of a compression ring and the compression ring is aligned with a bearing. Then the bicycle cable passes through a slot of a top cap and the cap is aligned with the compression ring and a headtube, so that the bicycle cable could be installed and routed stably and accurately.

However, an outer tubing of a conventional bicycle cable is rigid and could not be easily arranged. When the bicycle cable passes through the cable routing groove of the compression ring, the compression ring could not be easily aligned with the bearing due to the rigidity of the outer tubing of the bicycle cable. Even if the compression ring is aligned with the bearing, the bicycle cable could not be easily installed and routed on the top cap of the bicycle headset, and it is difficult to align the top cap with the compression ring due to the interference of the bicycle cable. As a result, the difficulty of assembling the bicycle headset is increased, thereby being more difficult and time-consuming to install and route the bicycle cable.

BRIEF SUMMARY OF THE INVENTION

In view of the above, the primary objective of the present disclosure is to provide a compression ring of a bicycle headset and a bicycle frame having the same, wherein the compression ring could reduce the assembling cost, thereby increasing the efficiency of installing and routing a bicycle cable.

The present disclosure provides a compression ring including an annular body. The annular body includes a through hole, a large-diameter portion, and a small-diameter portion. The large-diameter portion and the small-diameter portion surround the through hole and are connected with each other. The annular body has a cable guiding hole passing through the large-diameter portion and the small-diameter portion.

In an embodiment, a slot is provided on a side of the annular body and passes through the large-diameter portion and the small-diameter portion along an axial direction of the through hole. Two free ends of the annular body are formed respectively on two sides of the slot. The through hole radially communicates with the slot.

In an embodiment, the annular body includes a connecting portion and an annular groove. The connecting portion is located between the large-diameter portion and the small-diameter portion and is connected with the large-diameter portion and the small-diameter portion. The annular groove surrounds an outside of the annular body and is located between the connecting portion and the large-diameter portion.

In an embodiment, the compression ring further includes a sealing gasket that fits around the annular groove of the annular body and passes across the slot. The sealing gasket has a fitting portion and an outer annular portion, wherein the fitting portion is correspondingly received in the annular groove. The outer annular portion surrounds an outer periphery of the fitting portion and tightly abuts against a bottom edge of the large-diameter portion.

In an embodiment, the cable guiding hole passes through a top side surface of the large-diameter portion and a bottom side surface of the small-diameter portion along an axial direction of the through hole. A first cable hole of the cable guiding hole is formed on the top side surface of the large-diameter portion. A second cable hole of the cable guiding hole is formed on the bottom side surface of the small-diameter portion. An opening of the first cable hole is larger than an opening of the second cable hole.

In an embodiment, the annular body has a notch passing through an inner wall of the through hole. The first cable hole and the second cable hole communicate with the notch. The notch is located between the cable guiding hole and the through hole.

In an embodiment, the annular body includes a first annular base and a second annular base. The first annular base has a first engaging end, and the second annular base has a second engaging end, wherein the first engaging end and the second engaging end are correspondingly engaged with each other, allowing the first annular base and the second annular base to be detachably engaged with each other and to surround to form the through hole.

In an embodiment, the first annular base has a first free end opposite to the first engaging end. The second annular base has a second free end opposite to the second engaging end. When the first annular base and the second annular base are engaged with each other, a slot is formed to separate the first free end and the second free end and radially communicates with the through hole.

In an embodiment, the large-diameter portion includes a first section and a second section. The small-diameter portion includes a first section and a second section. The first annular base has the first section of the large-diameter portion and the first section of the small-diameter portion, wherein the first section of the large-diameter portion and the first section of the small-diameter portion are connected with each other. The second annular base has the second section of the large-diameter portion and the second section of the small-diameter portion, wherein the second section of the large-diameter portion and the second section of the small-diameter portion are connected with each other. When the first annular base and the second annular base are engaged with each other, a part of an end surface of the first engaging end corresponding to the first section of the large-diameter portion faces and abuts against a part of an end surface of the second engaging end corresponding to the second section of the large-diameter portion, and another part of the end surface of the first engaging end corresponding to the first section of the small-diameter portion faces and abuts against another part of the end surface of the second engaging end corresponding to the second section of the small-diameter portion.

In an embodiment, the first engaging end has a first hook portion. The first hook portion is recessed from a top side surface of the first annular base into a portion of the first section of the large-diameter portion to form a first groove opening upward, wherein a side of the first groove has a first positioning block. The second engaging end has a second hook portion. The second hook portion is recessed from a bottom side surface of the second annular base into a part of the second section of the small-diameter portion to form a second groove opening downward, wherein a side of the second groove has a second positioning block. When the first hook portion is engaged with the second hook portion, the first positioning block is correspondingly engaged with the second groove, and the second positioning block is correspondingly engaged with the first groove. The first hook portion and the second hook portion are stuck by each other. The first annular base and the second annular base are assembled to form the annular body.

In an embodiment, the end surface of the first engaging end has at least one first engaging portion. The end surface of the second engaging end has at least one second engaging portion. The first engaging portion of the first engaging end and the second engaging portion of the second engaging end match with each other in a concave-convex structure, assembling the first annular base and the second annular base to form the annular body.

The present disclosure further provides a bicycle frame including a headtube, the compression ring, and a bearing. The headtube has an abutting portion. The compression ring is disposed on an end of the headtube. The annular body enters the headtube through the small-diameter portion. An outer diameter of the large-diameter portion is larger than a diameter of the headtube. The large-diameter portion abuts against an end opening of the headtube. The cable guiding hole communicates with the headtube. The bearing is disposed in the headtube. The bearing surrounds the small-diameter portion of the annular body and abuts against the abutting portion.

In an embodiment, the headtube has a wide opening portion and a narrow portion. The abutting portion is located between the wide opening portion and the narrow portion. The wide opening portion is located on the end of the headtube. The narrow portion extends from the abutting portion along an axial direction of the headtube. An outer peripheral edge of the bearing has an outer abutting surface. The bearing is received in the wide opening portion and the outer abutting surface correspondingly abuts against the abutting portion.

In an embodiment, the annular body includes a connecting portion and an annular groove. The connecting portion is connected between the large-diameter portion and the small-diameter portion. The annular groove surrounds an outside of the annular body and is located between the connecting portion and the large-diameter portion. An inner peripheral edge of the bearing has an inner abutting surface. When the annular body is disposed on the headtube, the small-diameter portion and the connecting portion are received in the wide opening portion, wherein the small-diameter portion passes through an axial hole of the bearing and the connecting portion correspondingly abuts against the inner abutting surface of the bearing. A space is formed between a periphery of the small-diameter portion and an inner wall of the wide opening portion. The bearing fits around the connecting portion and the periphery of the small-diameter portion and is fixed in the space.

In an embodiment, the compression ring includes a sealing gasket fitting around the annular groove of the annular body for fixing. The sealing gasket has a fitting portion and an outer annular portion, wherein the fitting portion is correspondingly received in the annular groove, and the outer annular portion surrounds an outer periphery of the fitting portion and tightly abuts against a bottom edge of the large-diameter portion. When the annular body is disposed on the headtube, the outer annular portion of the sealing gasket abuts against the end opening of the headtube.

With the aforementioned design, when the bicycle cable of the bicycle frame is installed and routed, the bicycle cable could smoothly pass through the cable guiding hole of the annular body due to the monolithic design of the large-diameter portion and the small-diameter portion of the annular body of the compression ring. The annular body is directly disposed on the wide opening portion of the headtube, so that the compression ring could be quickly installed on the headtube. Therefore, the assembling cost of aligning the components of the compression ring could be reduced, so that the efficiency of installing and routing the bicycle cable could be increased, thereby relieving the problem of cable routing of the conventional bicycle headset mechanism.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
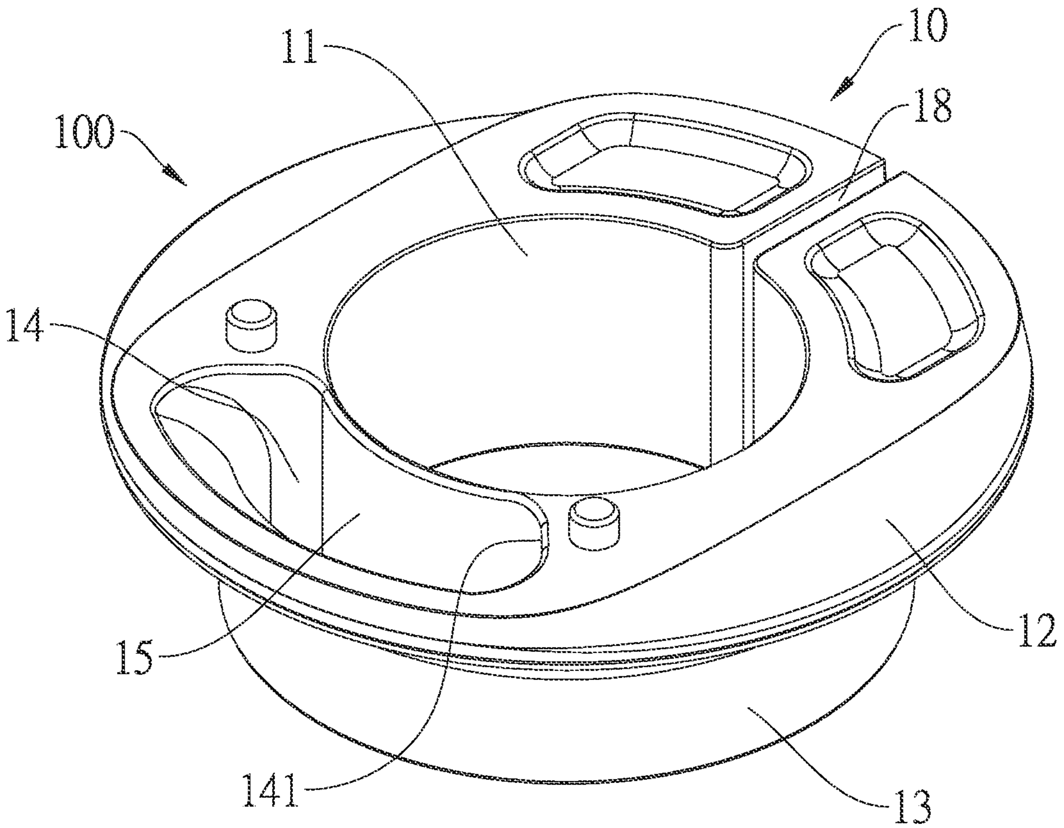
FIG. 1 is a perspective view of the compression ring according to a first embodiment of the present disclosure.
Figure 2:
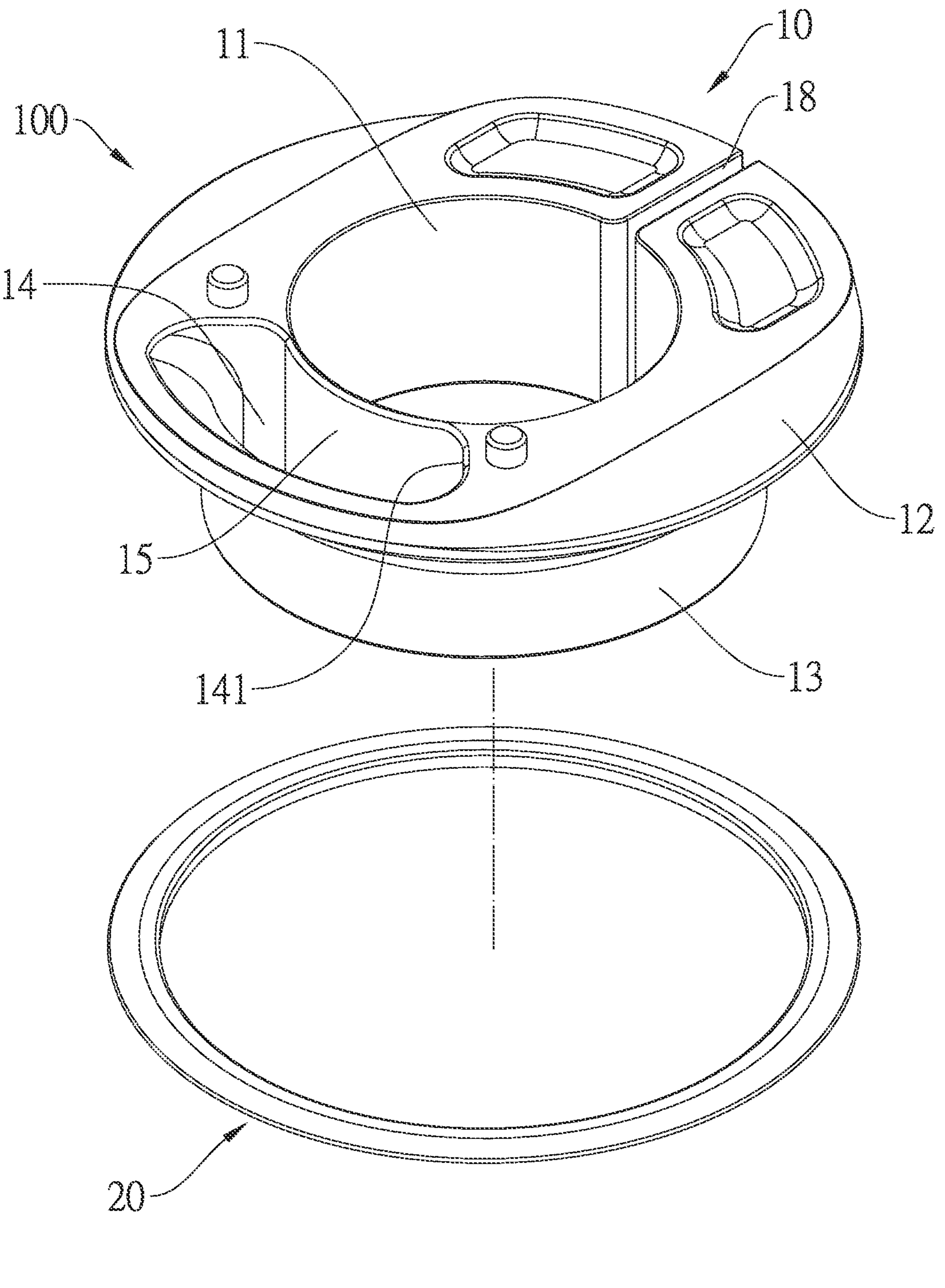
FIG. 2 is an exploded view of the compression ring according to the first embodiment of the present disclosure.

A compression ring 100 according to a first embodiment of the present disclosure is illustrated in FIG. 1 and FIG. 2 and basically includes an annular body 10 and a sealing gasket 20.

The annular body 10 includes a through hole 11, a large-diameter portion 12, and a small-diameter portion 13. The large-diameter portion 12 and the small-diameter portion 13 surround the through hole 11 and are connected with each other. The annular body 10 has a cable guiding hole 14 passing through a top side surface of the large-diameter portion 12 and a bottom side surface of the small-diameter portion 13 along an axial direction of the through hole 11. A bicycle cable (not shown) passes through the large-diameter portion 12 and the small-diameter portion 13 via the cable guiding hole 14. In the first embodiment, the annular body 10 is formed as a monolithic unit, i.e., the large-diameter portion 12 and the small-diameter portion 13 are connected as a monolithic unit and surround to form the through hole 11; referring to FIG. 3, the cable guiding hole 14 forms a first cable hole 141 that is in a long curved shape on the top side surface of the large-diameter portion 12; referring to FIG. 4, the cable guiding hole 14 forms a second cable hole 142 that is in a long curved shape on the bottom side surface of the small-diameter portion 13; the first cable hole 141 is vertically aligned with the second cable hole 142 along the cable guiding hole 14, wherein an opening of the first cable hole 141 is larger than an opening of the second cable hole 142.

Figure 3:
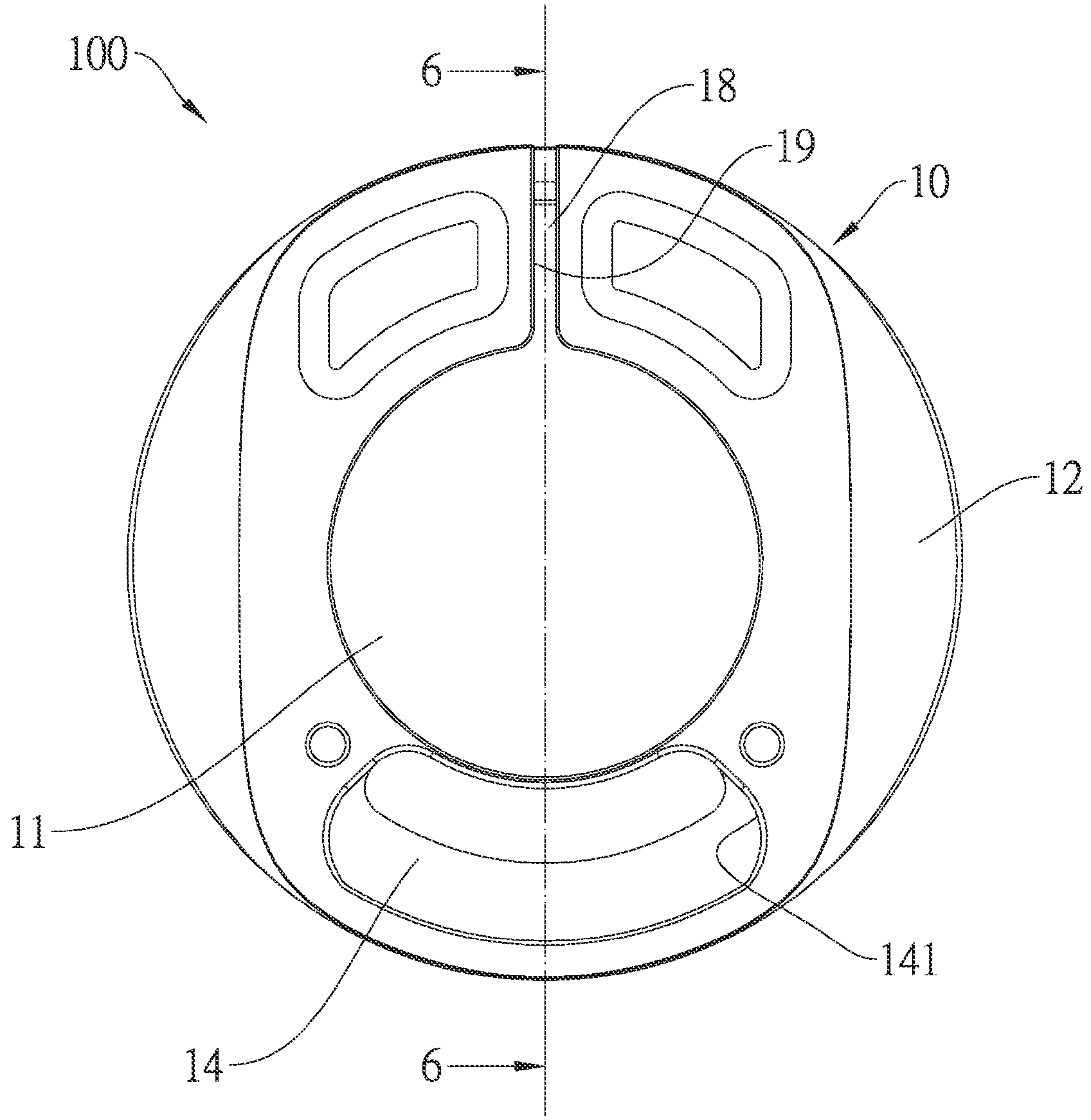
FIG. 3 is a top view of the compression ring according to the first embodiment of the present disclosure.
Figure 4:
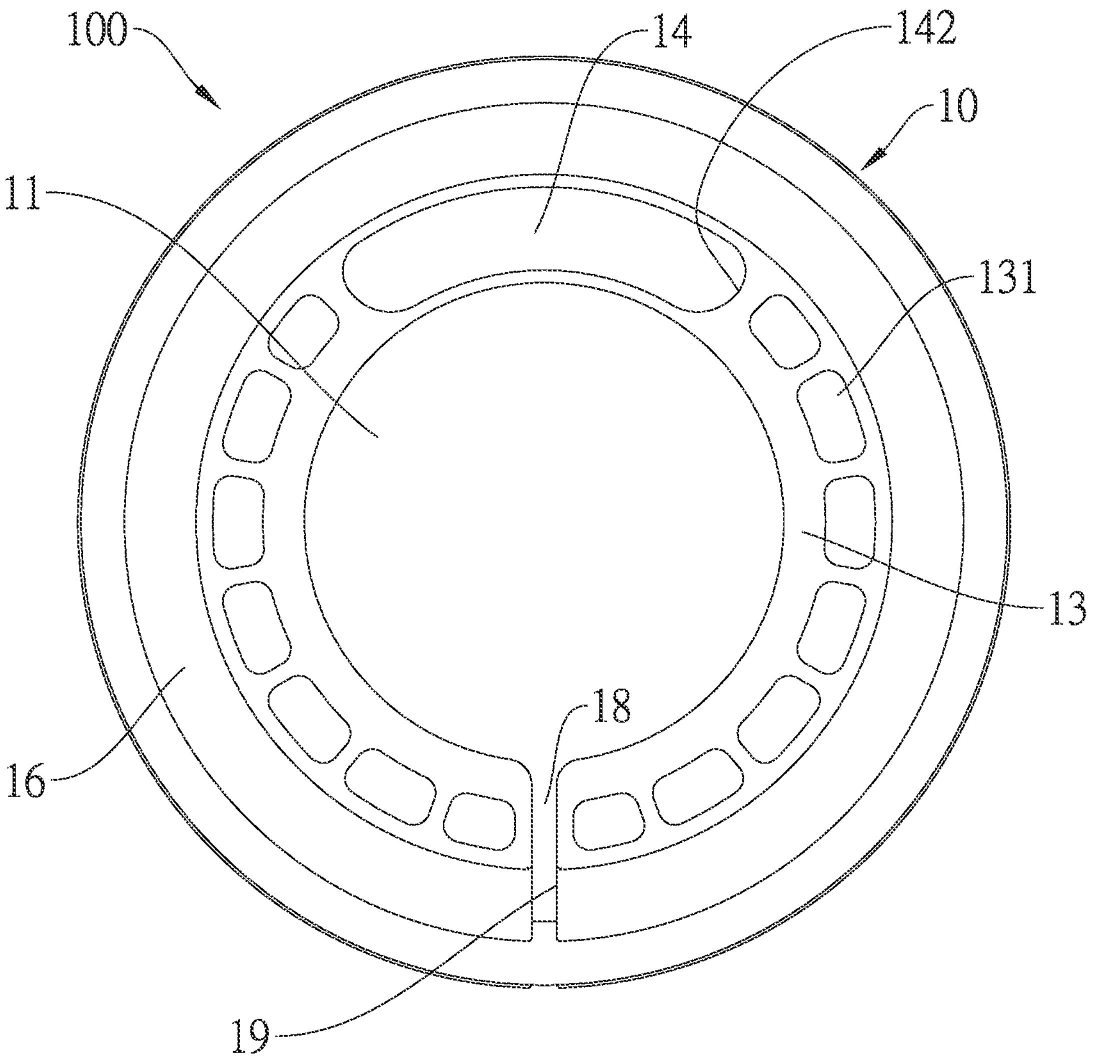
FIG. 4 is a bottom view of the compression ring according to the first embodiment of the present disclosure.

As shown in FIG. 1 to FIG. 3, a separating portion 15 is provided between the cable guiding hole 14 and the through hole 11 and is a part of an inner wall of the through hole 11, so that the cable guiding hole 14 and the through hole 11 do not directly communicate with each other through separating by the separating portion 15. As shown in FIG. 4, a plurality of perforations 131 passes through the small-diameter portion 13 and is arranged at intervals along the bottom side surface of the small-diameter portion 13. The perforations 131 of the small-diameter portion 13 are adapted to reduce a weight of the annular body 10.

In other embodiments, the separating portion 15 between the cable guiding hole 14 and the through hole 11 could be omitted, and a notch could be formed to communicate between the cable guiding hole 14 and the through hole 11, as long as the annular body 10 basically has the through hole 11 and the cable guiding hole 14; the number and the position of the perforations 131 of the small-diameter portion 13 could be adjusted according to the structural requirement of the annular body 10 or the perforations 131 could be omitted, as along as the second cable hole 142 is provided on the bottom side surface of the small-diameter portion 13.

Figure 5:
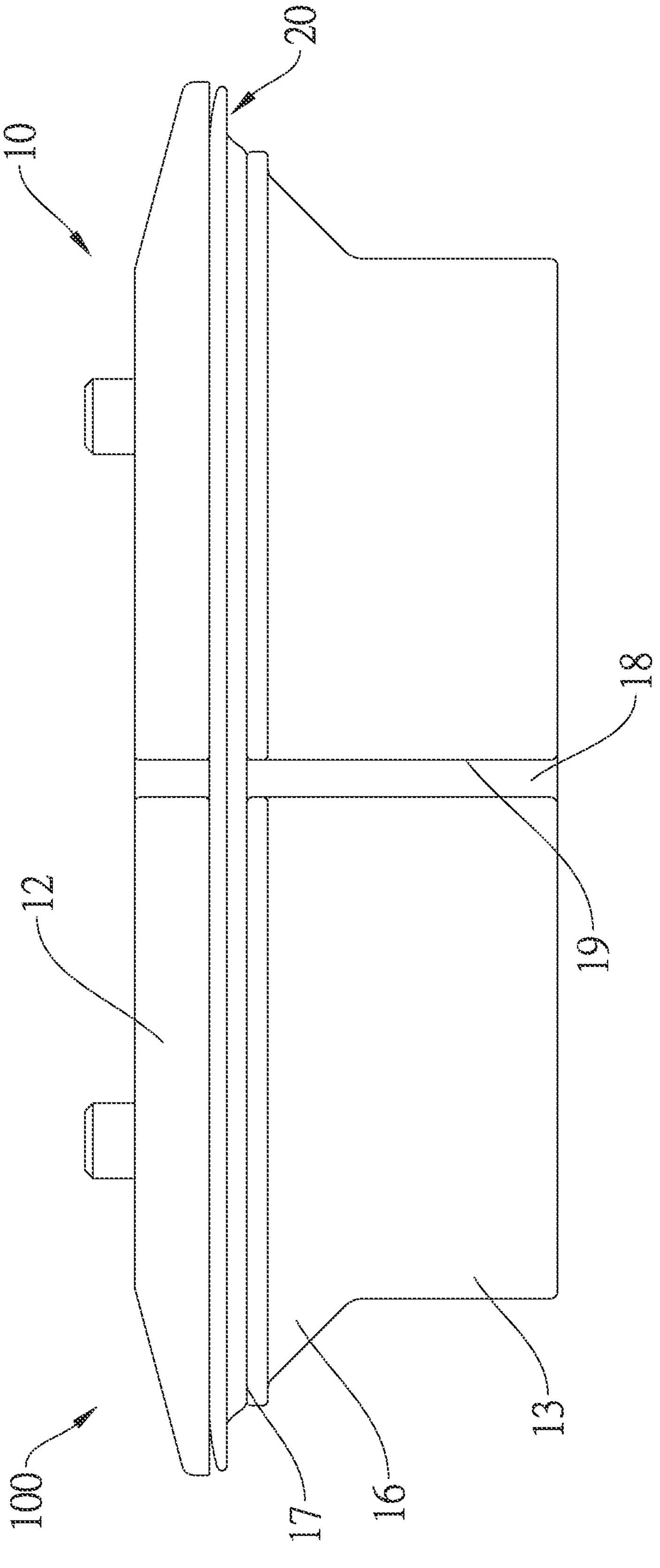
FIG. 5 is a side view of the compression ring according to the first embodiment of the present disclosure.
Figure 6:
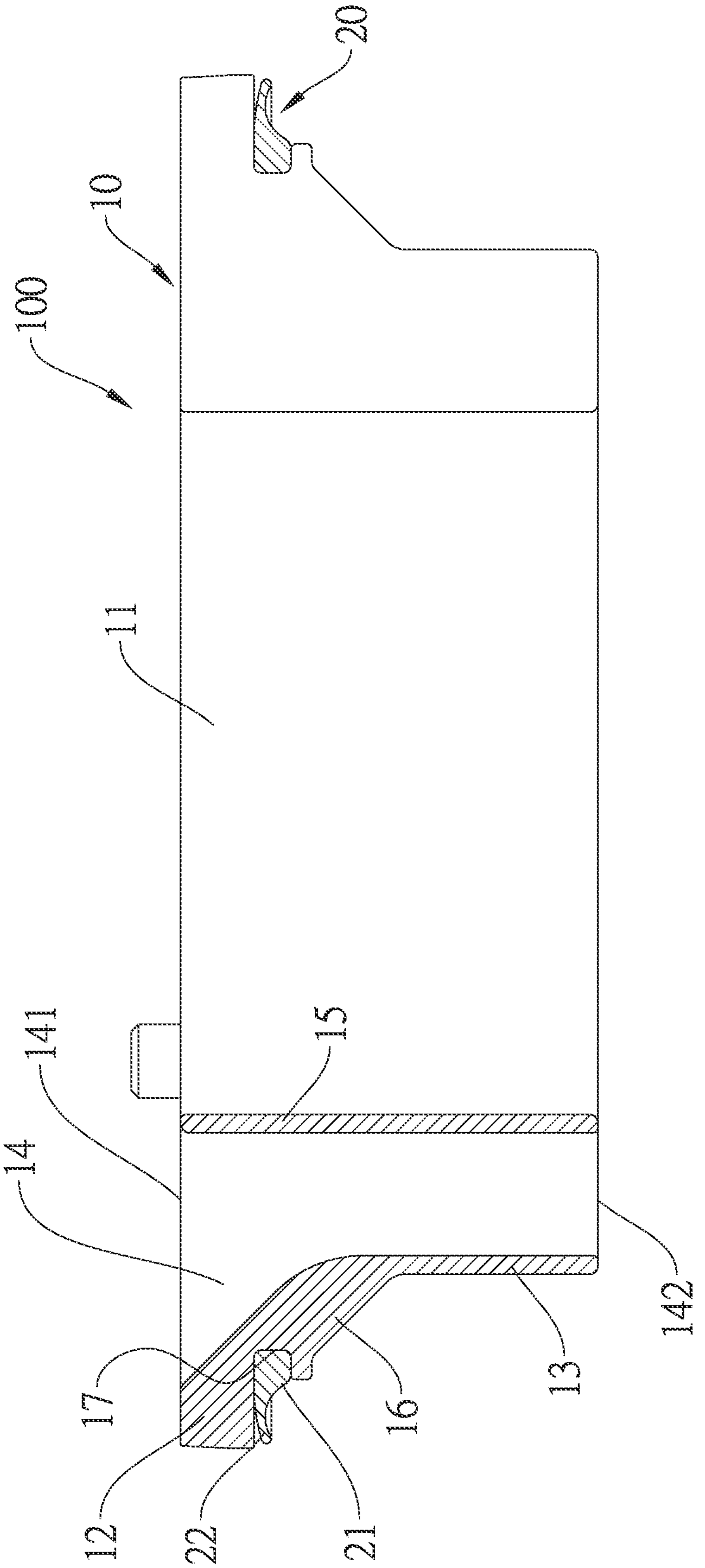
FIG. 6 is a sectional view along the 6-6 line in FIG. 3.

Additionally, referring to FIG. 5 and FIG. 6, the annular body 10 further includes a connecting portion 16, an annular groove 17, and a slot 18. The connecting portion 16 is located between the large-diameter portion 12 and the small-diameter portion 13 and is connected with the large-diameter portion 12 and the small-diameter portion 13. The cable guiding hole 14 vertically passes through the large-diameter portion 12, the connecting portion 16, and the small-diameter portion 13. The cable guiding hole 14 has a chamfer angle corresponding to the connecting portion 16, thereby facilitating the bicycle cable to pass through the cable guiding hole 14. The annular groove 17 surrounds between the connecting portion 16 and the large-diameter portion 12 (shown in FIG. 5), wherein the sealing gasket 20 is installed on the annular groove 17. As shown in FIG. 3 and FIG. 5, the slot 18 vertically separates a side of the annular body 10. The slot 18 vertically passes through the large-diameter portion 12, the connecting portion 16, and small-diameter portion 13 along an axis of the through hole 11, so that two free ends 19 of the annular body 10 are formed respectively on two sides of the slot 18, wherein the two free ends 19 are open end portions corresponding to the large-diameter portion 12, the connecting portion 16, and the small-diameter portion 13. The through hole 11 radially communicates with the slot 18, so that a flexible space is formed between the two free ends 19 of the annular body 10.

In other embodiments, the annular body 10 is not limited to include the connecting portion 16, the annular groove 17, and the slot 18; for example, the connecting portion 16, the annular groove 17, and the slot 18 of the annular body 10 could be omitted without affecting the basic structure of the large-diameter portion 12 and the small-diameter portion 13, as long as the large-diameter portion 12 and the small-diameter portion 13 of the annular body 10 could be connected with each other to form a monolithic unit.

The sealing gasket 20 fits around the annular body 10 for fixing. The sealing gasket 20 passes through the small-diameter portion 13 to fit around the annular groove 17 and to pass across the slot 18. When the compression ring 100 is adapted to be disposed on a headtube (not shown), the sealing gasket 20 could seal a connecting gap between the annular body 10 and the headtube. Referring to FIG. 6, in the current embodiment, the sealing gasket 20 has a fitting portion 21 and an outer annular portion 22, wherein the fitting portion 21 is correspondingly received in the annular groove 17. The outer annular portion 22 surrounds an outer periphery of the fitting portion 21. When the sealing gasket 20 fits around the annular groove 17 for fixing, the outer annular portion 22 protrudes out of the annular groove 17 relative to the fitting portion 21 and tightly abuts against a bottom edge of the large-diameter portion 12.

In other embodiments, the sealing gasket 20 could be changed to other structures based on the requirement; for example, the sealing gasket 20 could be changed to a conventional waterproof gasket and is not limited to have the fitting portion 21 and the outer annular portion 22; the sealing gasket 20 could be omitted as well.

In this way, the large-diameter portion 12 and the small-diameter portion 13 of the annular body 10 of the compression ring 100 are connected with each other to form a monolithic unit, so that the assembling cost of aligning the components of the compression ring 100 could be reduced, thereby allowing the compression ring 100 to be quickly installed on the headtube. Additionally, the cable guiding hole 14 of the annular body 10 passes through the large-diameter portion 12 and the small-diameter portion 13, so that the bicycle cable could pass through the annular body 10 through the cable guiding hole 14, thereby increasing the efficiency of installing and routing the bicycle cable.

A compression ring 200 according to a second embodiment of the present disclosure is illustrated in FIG. 7 to FIG. 10 and basically includes an annular body 30 and a sealing gasket 40.

The annular body 30 includes a through hole 31, a large-diameter portion 32, and a small-diameter portion 33. The large-diameter portion 32 and the small-diameter portion 33 surrounds the through hole 31 and are connected with each other. The annular body 30 has a cable guiding hole 34 passing through the large-diameter portion 32 and the small-diameter portion 33 along an axial direction of the through hole 31. The difference between the annular body 30 in the second embodiment and the annular body 10 in the first embodiment is that the annular body 30 in the second embodiment is a detachable structure instead of a monolithic structure.

Figure 8:
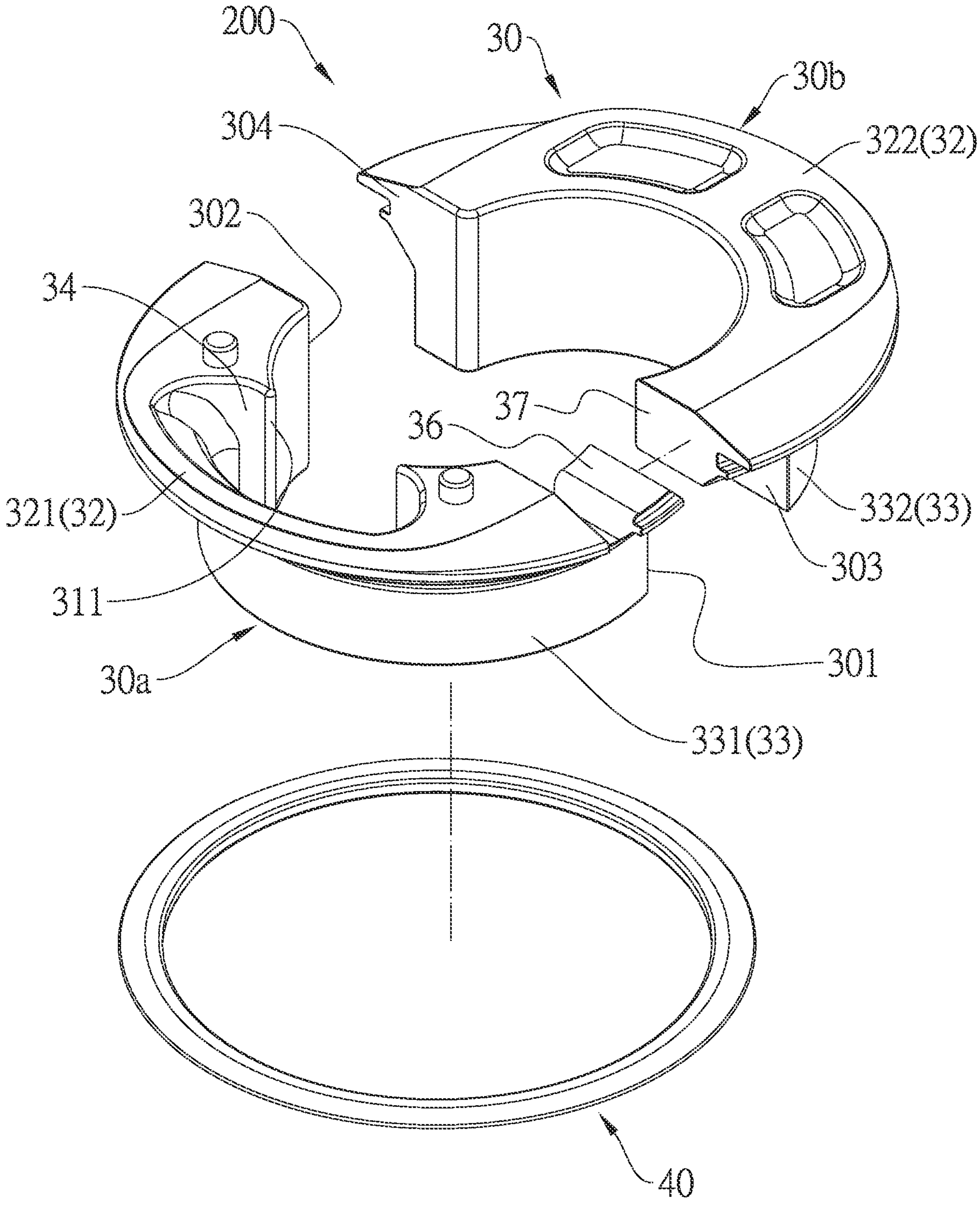
FIG. 8 is an exploded view of the compression ring according to the second embodiment of the present disclosure.
Figure 9:
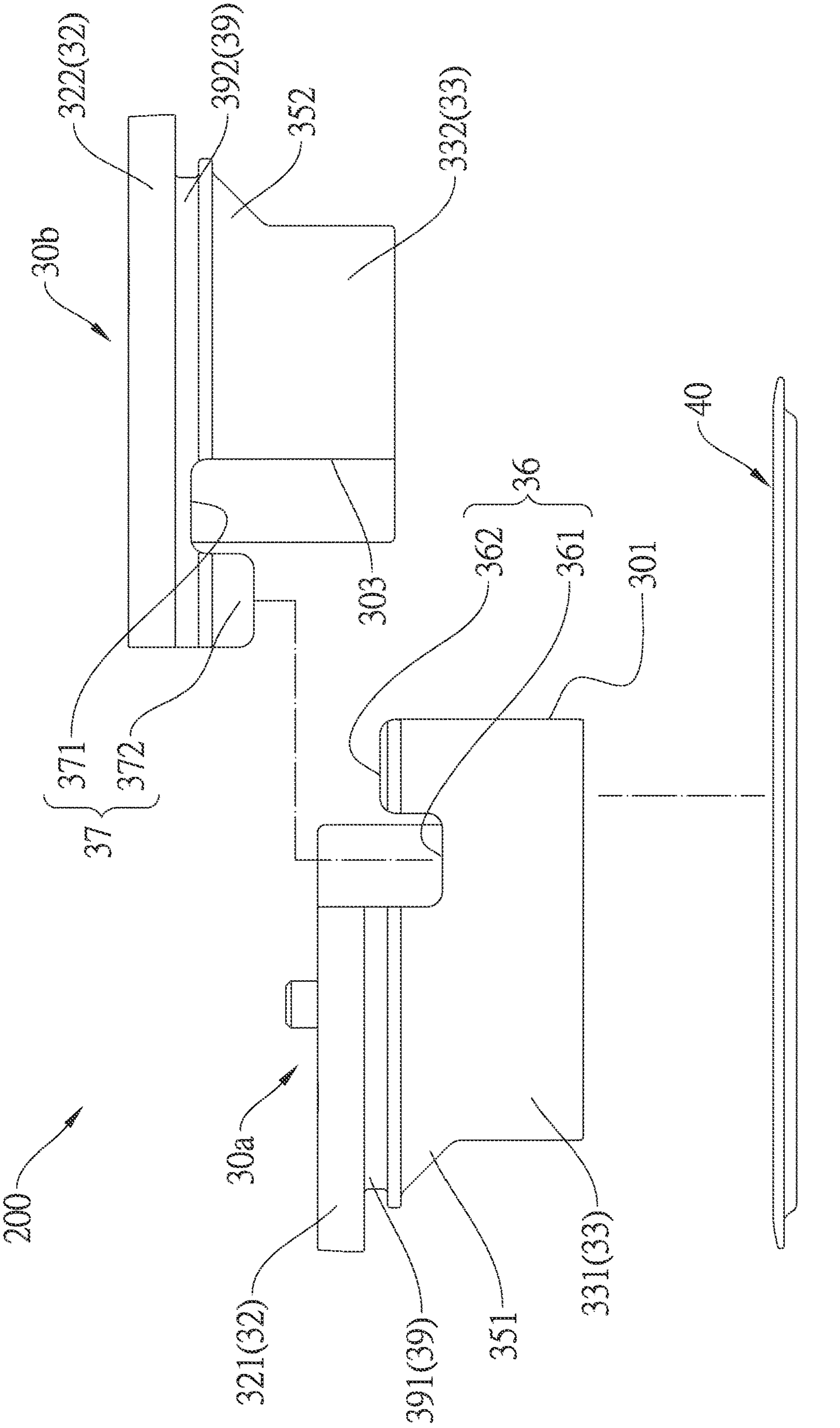
FIG. 9 is a schematic side view of FIG. 8.
Figure 10:
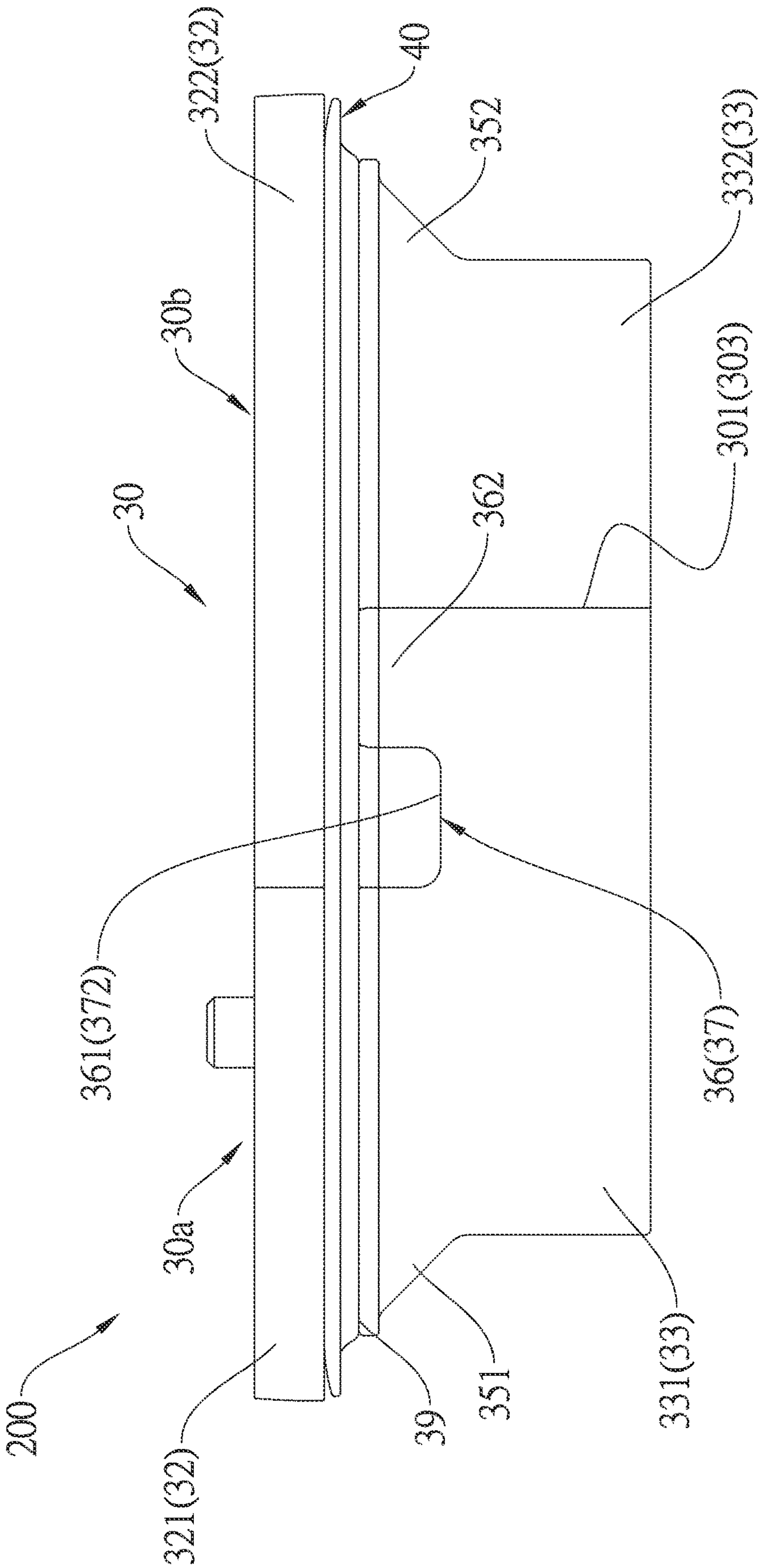
FIG. 10 is a side view, showing the compression ring according to the second embodiment of the present disclosure being assembled.

As shown in FIG. 8 to FIG. 10, the annular body 30 includes a first annular base 30*a* and a second annular base 30*b*, wherein the first annular base 30*a* is detachably engaged with the second annular base 30*b*. The large-diameter portion 32 includes a first section 321 and a second section 322. The small-diameter portion 33 includes a first section 331 and a second section 332. As shown in FIG. 9, the first annular base 30*a* has the first section 321 of the large-diameter portion 32, the first section 331 of the small-diameter portion 33, and a first connecting section 351 connected between the first section 321 of the large-diameter portion 32 and the first section 331 of the small-diameter portion 33, so that the first section 321 of the large-diameter portion 32, the first connecting section 351, and the first section 331 of the small-diameter portion 33 are connected with one another to form a monolithic unit. As shown in FIG. 8 and FIG. 9, the first annular base 30*a* has the cable guiding hole 34 passing through the first section 321 of the large-diameter portion 32, the first connecting section 351, and the first section 331 of the small-diameter portion 33. As shown in FIG. 9, the second annular base 30*b* has the second section 322 of the large-diameter portion 32, the second section 332 of the small-diameter portion 33, and a second connecting section 352 connected between the second section 322 of the large-diameter portion 32 and the second section 332 of the small-diameter portion 33, so that the second section 322 of the large-diameter portion 32, the second connecting section 352, and the second section 332 of the small-diameter portion 33 are connected with one another to form a monolithic unit.

Additionally, referring to FIG. 8 and FIG. 9, a first engaging end 301 and a first free end 302 are respectively provided on two ends of the first annular base 30*a*. A second engaging end 303 and a second free end 304 are respectively provided on two ends of the second annular base 30*b*. The first engaging end 301 and the second engaging end 303 are correspondingly engaged with each other. In the second embodiment, the first engaging end 301 has a first hook portion 36. The first hook portion 36 is recessed from a top side surface of the first annular base 30*a* into a portion of the first section 321 of the large-diameter portion 32 and a portion of the first connecting section 351 to form a first groove 361 opening upward. A side of the first groove 361 has a first positioning block 362 (shown in FIG. 9). The second engaging end 303 has a second hook portion 37. The second hook portion 37 is recessed from a bottom side surface of the second annular base 30*b* into a portion of the second section 332 of the small-diameter portion 33 and a portion of the second connecting section 352 to form a second groove 371 opening downward. A side of the second groove 371 has a second positioning block 372 (shown in FIG. 9). As shown in FIG. 10, when the first hook portion 36 and the second hook portion 37 are engaged with each other, the first positioning block 362 is correspondingly engaged with the second groove 371 and the second positioning block 372 is correspondingly engaged with the first groove 361, so that the first hook portion 36 and the second hook portion 37 are stuck by each other and the first annular base 30*a* and the second annular base 30*b* are assembled to form the annular body 30.

In other embodiments, the first hook portion 36 of the first annular base 30*a* and the second hook portion 37 of the second annular base 30*b* could be adjusted according to the requirements; the first hook portion 36 is not limited to have the first groove 361 and the first positioning block 362, and the second hook portion 37 is not limited to have the second groove 371 and the second positioning block 372, as long as the first hook portion 36 and the second hook portion 37 could be correspondingly engaged with each other.

Figure 7:
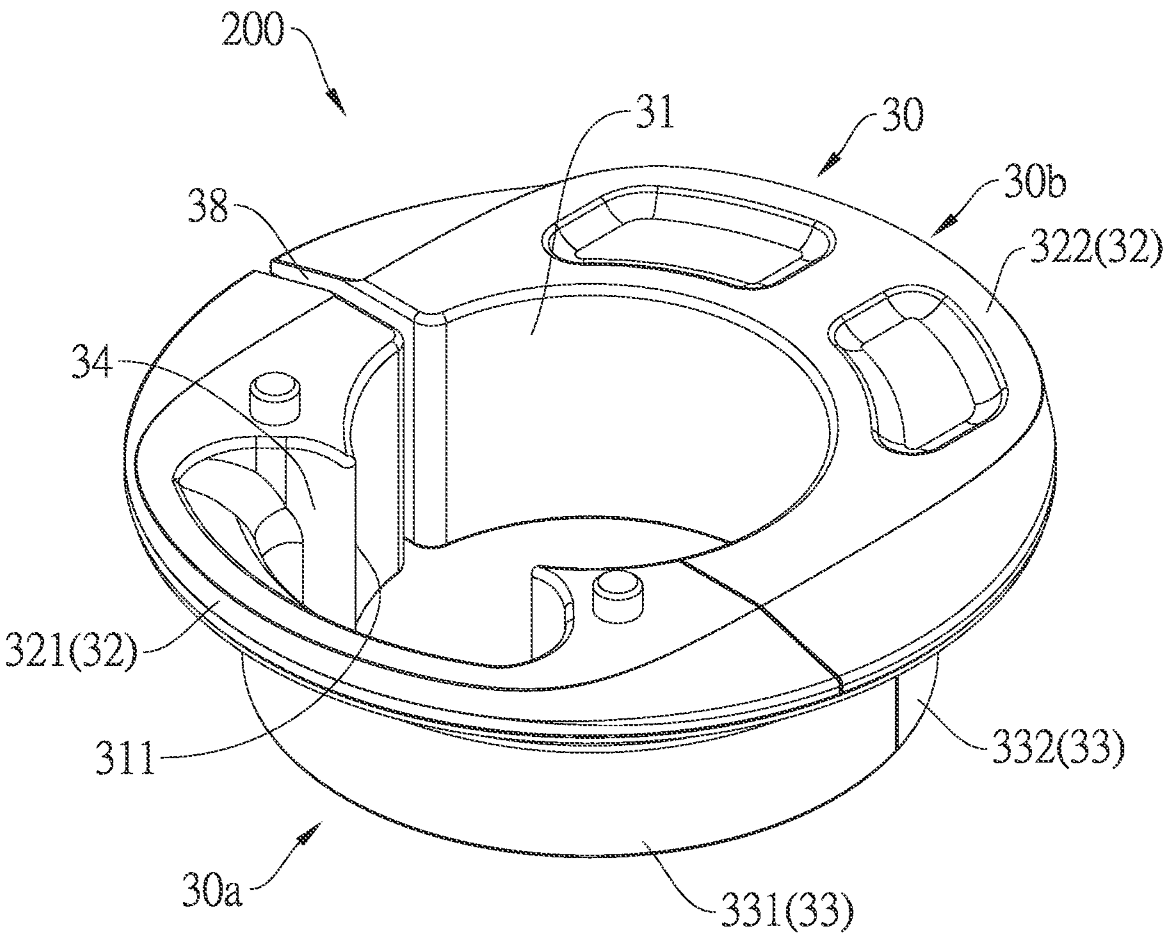
FIG. 7 is a perspective view of the compression ring according to a second embodiment of the present disclosure.

Referring to FIG. 10, when the first annular base 30*a* and the second annular base 30*b* are engaged with each other through the first engaging end 301 and the second engaging end 303, a part of an end surface of the first engaging end 301 corresponding to the first section 321 of the large-diameter portion 32 abuts against a part of an end surface of the second engaging end 303 corresponding to the second section 322 of the large-diameter portion 32, another part of the end surface of the first engaging end 301 corresponding to the first section 331 of the small-diameter portion 33 abuts against another part of the end surface of the second engaging end 303 corresponding to the second section 332 of the small-diameter portion 33, and an inside of the first annular base 30*a* and an inside of the second annular base 30*b* surround to form the through hole 31. A slot 38 is formed to separate the first free end 302 of the first annular base 30*a* and the second free end 304 of the second annular base 30*b*. The through hole 31 radially communicates with the slot 38. As shown in FIG. 7 and FIG. 10, the first annular base 30*a* of the annular body 30 has a notch 311, wherein the notch 311 of the first annular base 30*a* passes through an inner wall of the through hole 31, and the cable guiding hole 34 communicates with the notch 311, so that the notch 311 is located between the cable guiding hole 34 and the through hole 31, and the through hole 31 directly and radially communicates with the cable guiding hole 34. In this way, the wear and tear of the through hole 31 due to a bicycle cable (not shown) passing through the cable guiding hole 34 could be reduced, so that the bicycle cable could pass through the cable guiding hole 34 smoothly, thereby increasing the service life of the annular body 30.

Additionally, referring to FIG. 9, the first annular base 30*a* has a first annular groove 391 surrounding between the first section 321 of the large-diameter portion 32 and the first connecting section 351. The second annular base 30*b* has a second annular groove 392 surrounding between the second section 322 of the large-diameter portion 32 and the second connecting section 352. When the first annular base 30*a* is engaged with the second annular base 30*b*, the first annular groove 391 and the second annular groove 392 communicate with each other to form an annular groove 39.

The sealing gasket 40 fits around the annular groove 39 of the annular body 30, thereby enhancing the engagement between the first annular base 30*a* and the second annular base 30*b*. The structure of the sealing gasket 40 in the second embodiment is the same as the structure of the sealing gasket 20 in the first embodiment.

A compression ring 200' according to a third embodiment of the present disclosure is illustrated in FIG. 11 to FIG. 15 and basically includes an annular body 30' and a sealing gasket 40'. The structure of the sealing gasket 40' in the third embodiment is the same as the structure of the sealing gasket 40 in the second embodiment.

Figure 11:
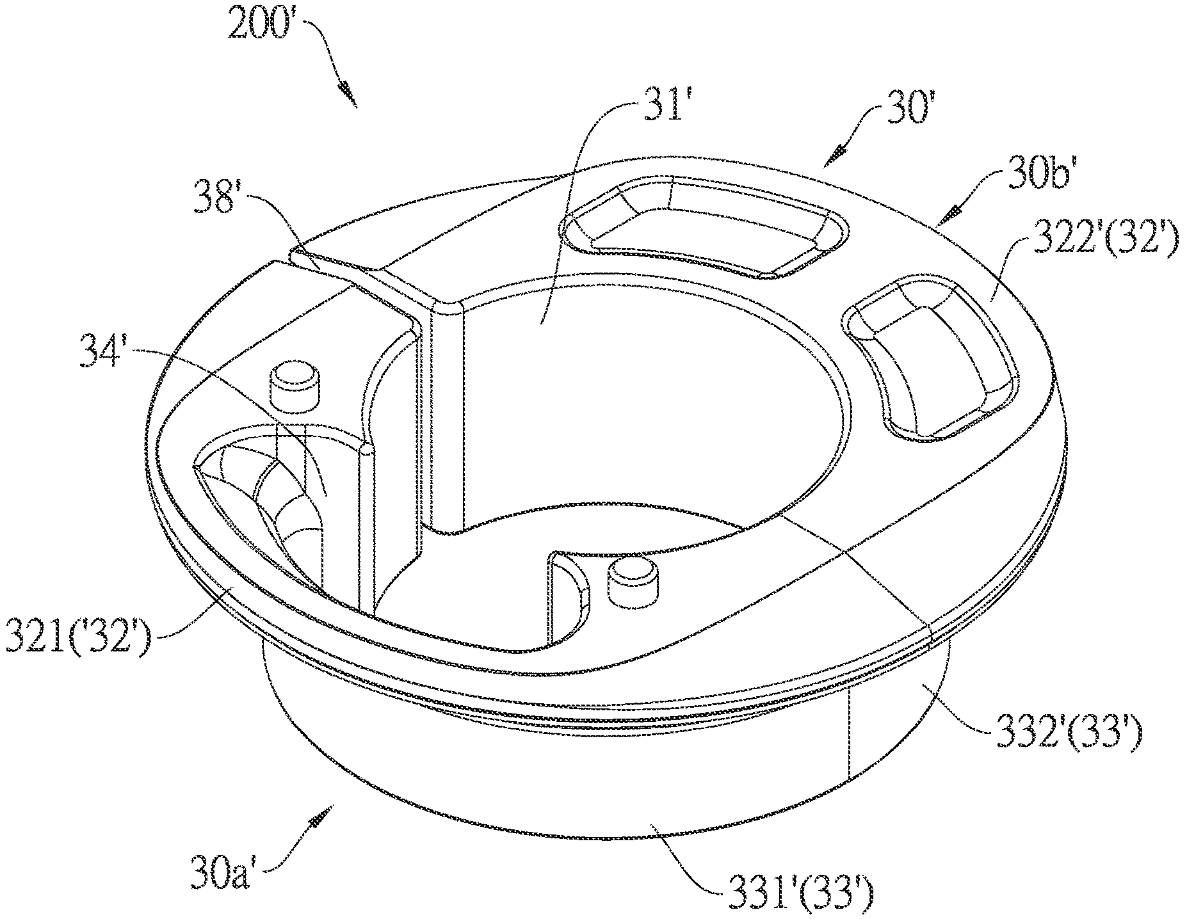
FIG. 11 is a perspective view of the compression ring according to a third embodiment of the present disclosure.
Figure 12:
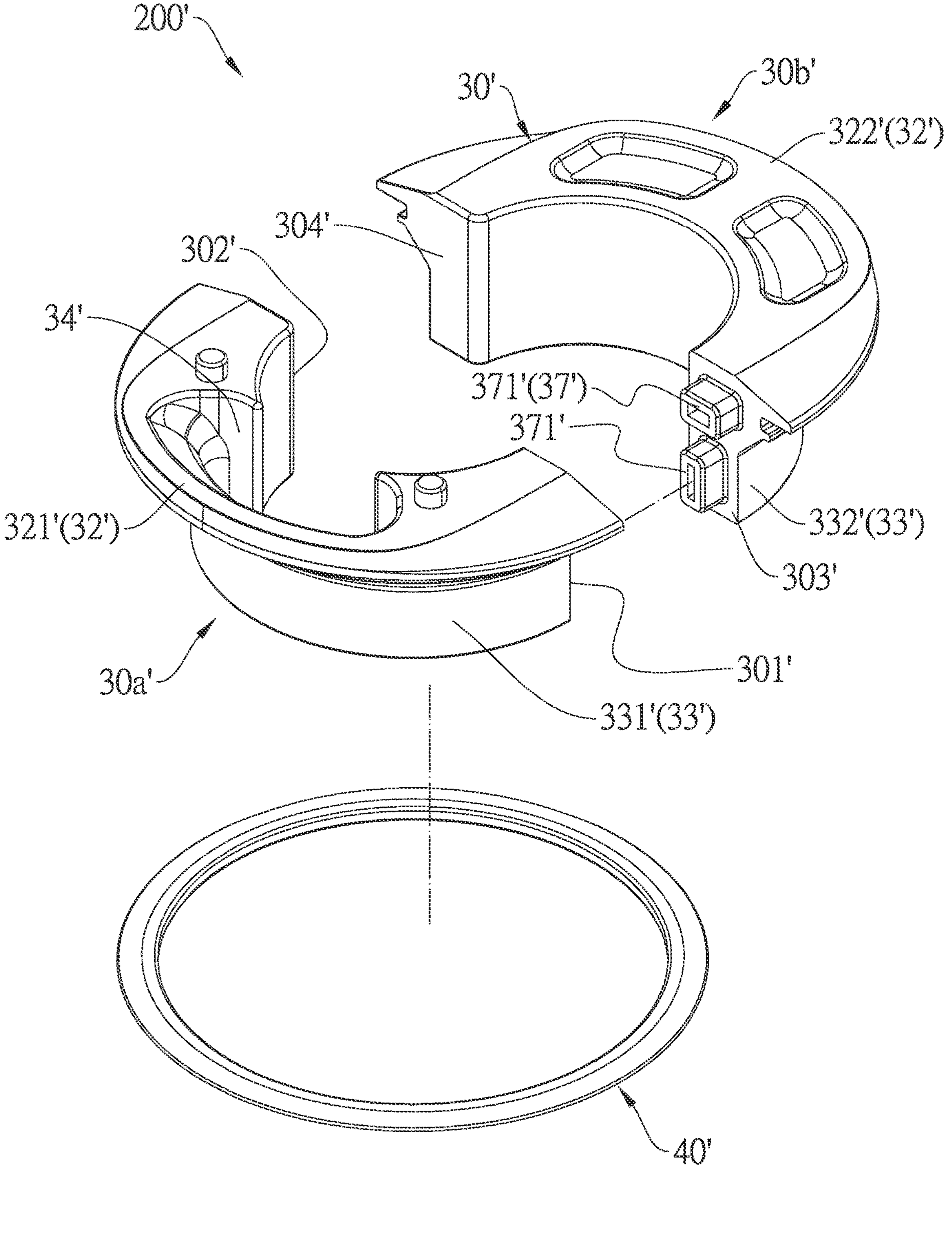
FIG. 12 is an exploded view of the compression ring according to the third embodiment of the present disclosure.
Figure 13:
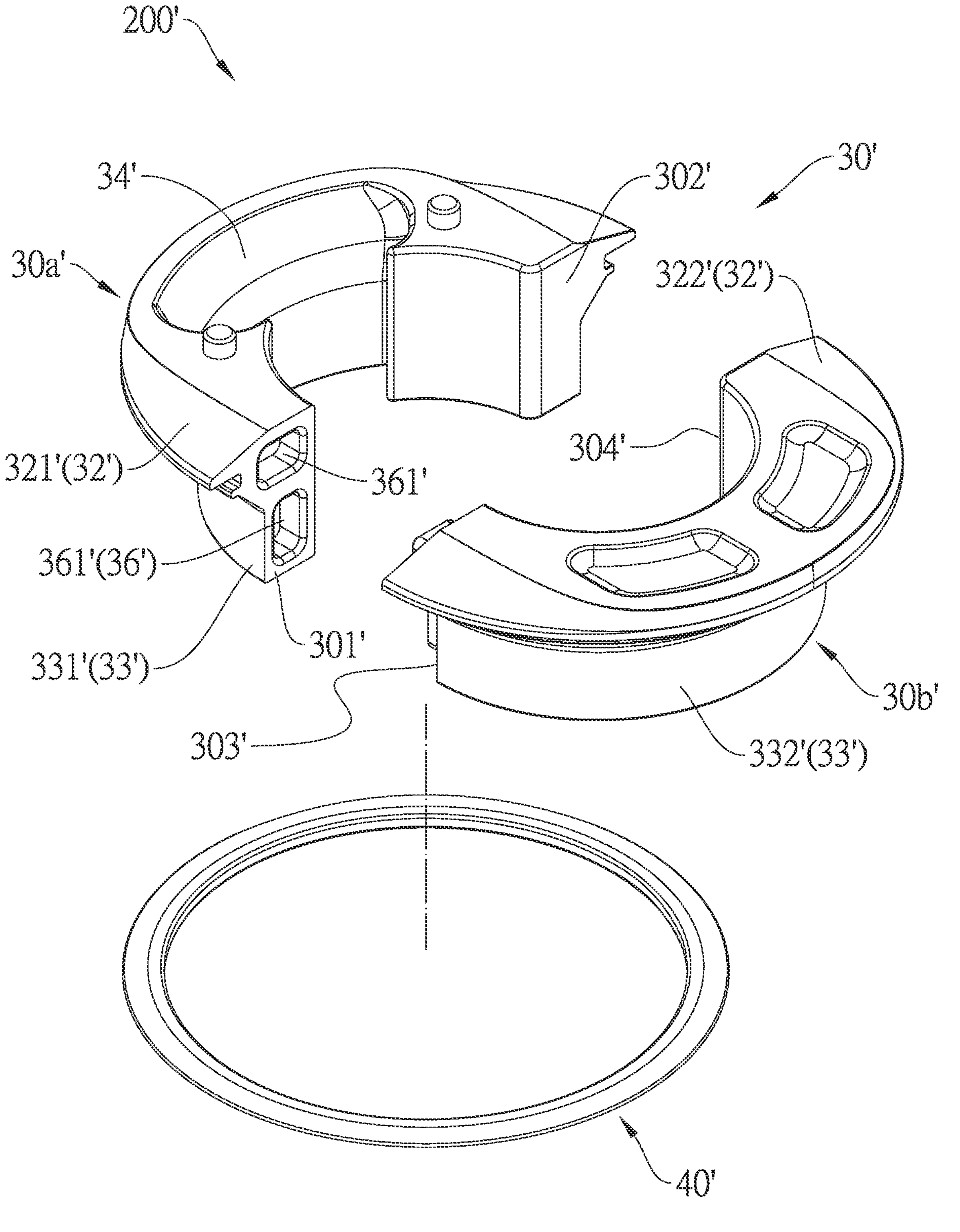
FIG. 13 is an exploded view of the compression ring according to the third embodiment of the present disclosure seen from another direction.
Figure 14:
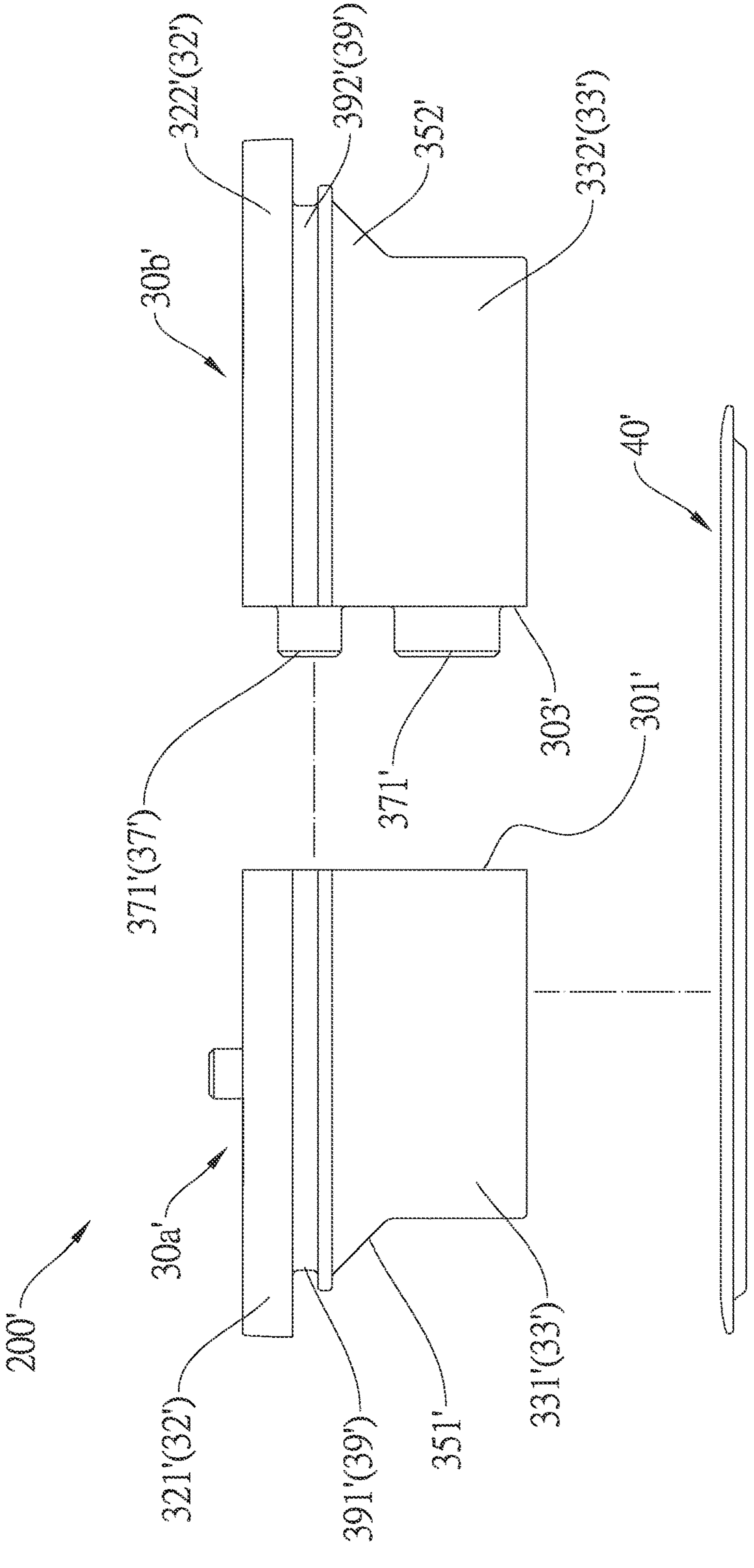
FIG. 14 is a schematic side view, showing the compression ring according to the third embodiment of the present disclosure being exploded.

The annular body 30' includes a through hole 31', a large-diameter portion 32', and a small-diameter portion 33'. The large-diameter portion 32' and the small-diameter portion 33' surround the through hole 31' and are connected with each other. The annular body 30' has a cable guiding hole 34' passing through the large-diameter portion 32' and the small-diameter portion 33' along an axial direction of the through hole 31'. As shown in FIG. 11 to FIG. 14, the annular body 30' includes a first annular base **30*a*' and a second annular base 30*b*', wherein the first annular base 30*a*' and the second annular base 30*b*' are detachably engaged with each other. The large-diameter portion 32' includes a first section 321' and a second section 322'. The small-diameter portion 33' includes a first section 331' and a second section 332'. As shown in FIG. 14, the first annular base 30*a*' has the first section 321' of the large-diameter portion 32', the first section 331' of the small-diameter portion 33', and a first connecting section 351' connected between the first section 321' of the large-diameter portion 32' and the first section 331' of the small-diameter portion 33'. Referring to FIG. 11 to FIG. 13, the first annular base 30*a*' has the cable guiding hole 34' passing through the first section 321' of the large-diameter portion 32', the first connecting section 351', and the first section 331' of the small-diameter portion 33'. Referring to FIG. 14, the second annular base 30*b*' has the second section 322' of the large-diameter portion 32', the second section 332' of the small-diameter portion 33', and a second connecting section 352' connected between the second section 322' of the large-diameter portion 32' and the second section 332' of the small-diameter portion 33'**.

Additionally, referring to FIG. 11 to FIG. 14, a first engaging end 301' and a first free end 302' are respectively provided on two ends of the first annular base **30*a*', and a second engaging end 303 and a second free end 304' are respectively provided on two ends of the second annular base 30*b*'. The first engaging end 301' and the second engaging end 303' are correspondingly engaged with each other. The engaging structure between the first engaging end 301' and the second engaging end 303' in the third embodiment is different from that in the second embodiment. In the third embodiment, two first engaging portions 36' are provided on an end surface of the first engaging end 301', and two second engaging portions 37' are provided on an end surface of the second engaging end 303', wherein the two first engaging portions 36' of the first engaging end 301' matches with the two second engaging portions 37' of the second engaging end 303' in a concave-convex structure. Referring to FIG. 11 to FIG. 14, two assembling grooves 361' are formed by respectively recessing into an end surface of one of the two first engaging portions 36' corresponding to the first section 321' of the large-diameter portion 32' and an end surface of the other first engaging portion 36' corresponding to the first section 331' of the small-diameter portion 33' (shown in FIG. 13). Two assembling blocks 371' are formed by respectively protruding from an end surface of one of the two second engaging portions 37' corresponding to the second section 322' of the large-diameter portion 32' and an end surface of the other second engaging portion 37' corresponding to the second section 332' of the small-diameter portion 33' (shown in FIG. 12). The two assembling grooves 361' correspondingly match with the two assembling blocks 371', so that the first annular base 30*a*' and the second annular base 30*b*' are assembled to form the annular body 30' (shown in FIG. 15**).

In other embodiments, positions, shapes, and numbers of the two first engaging portions 36' of the first annular base **30*a*' and the two second engaging portions 37' of the second annular base 30*b*' could be adjusted based on the requirements; the number of the first engaging portion 36' and the number of the second engaging portion 37' could respectively be at least one, which also allows the first annular base 30*a*' to be engaged with the second annular base 30*b*'**.

Additionally, referring to FIG. 11, when the first annular base **30*a*' and the second annular base 30*b*' are engaged with each other through the first engaging end 301' and the second engaging end 303', an inside of the first annular base 30*a*' and an inside of the second annular base 30*b*' surround to form the through hole 31'. A slot 38' is formed to separate the first free end 302' of the first annular base 30*a*' and the second free end 304' of the second annular base 30*b*'**.

Figure 15:
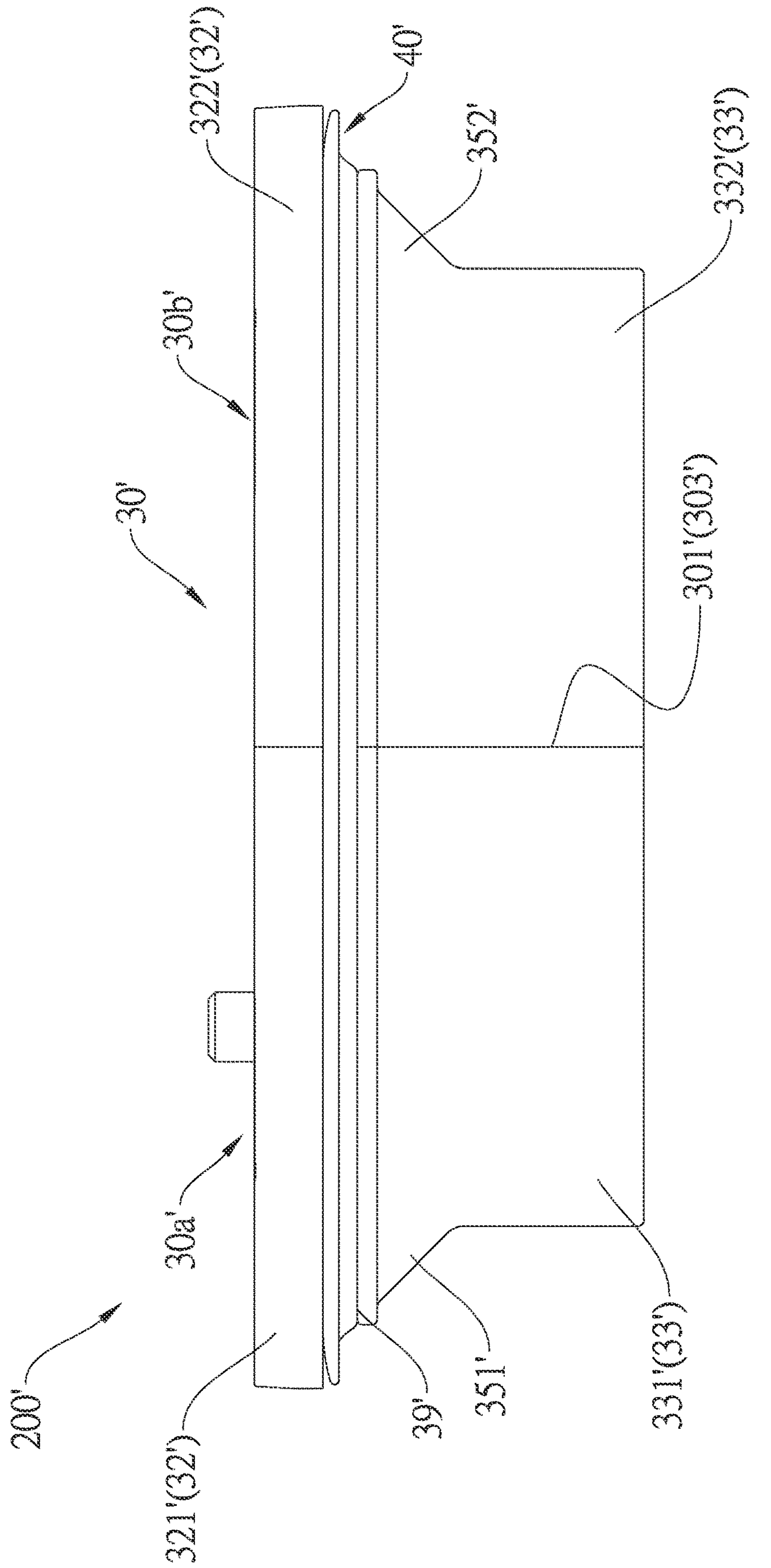
FIG. 15 is a schematic side view, showing the compression ring according to the third embodiment of the present disclosure being assembled.
Figure 16:
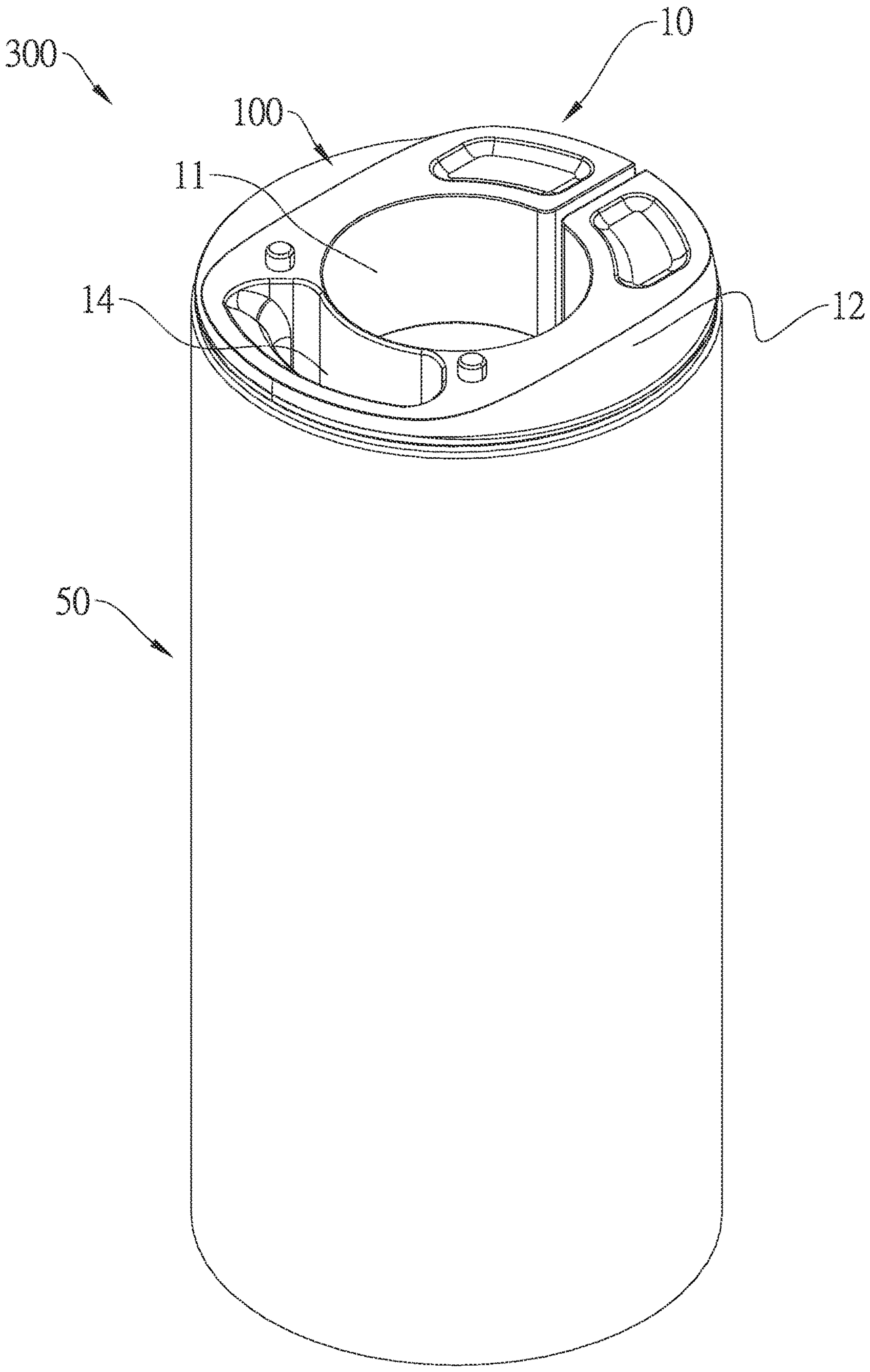
FIG. 16 is a perspective view of the bicycle frame according to a fourth embodiment of the present disclosure.
Figure 17:
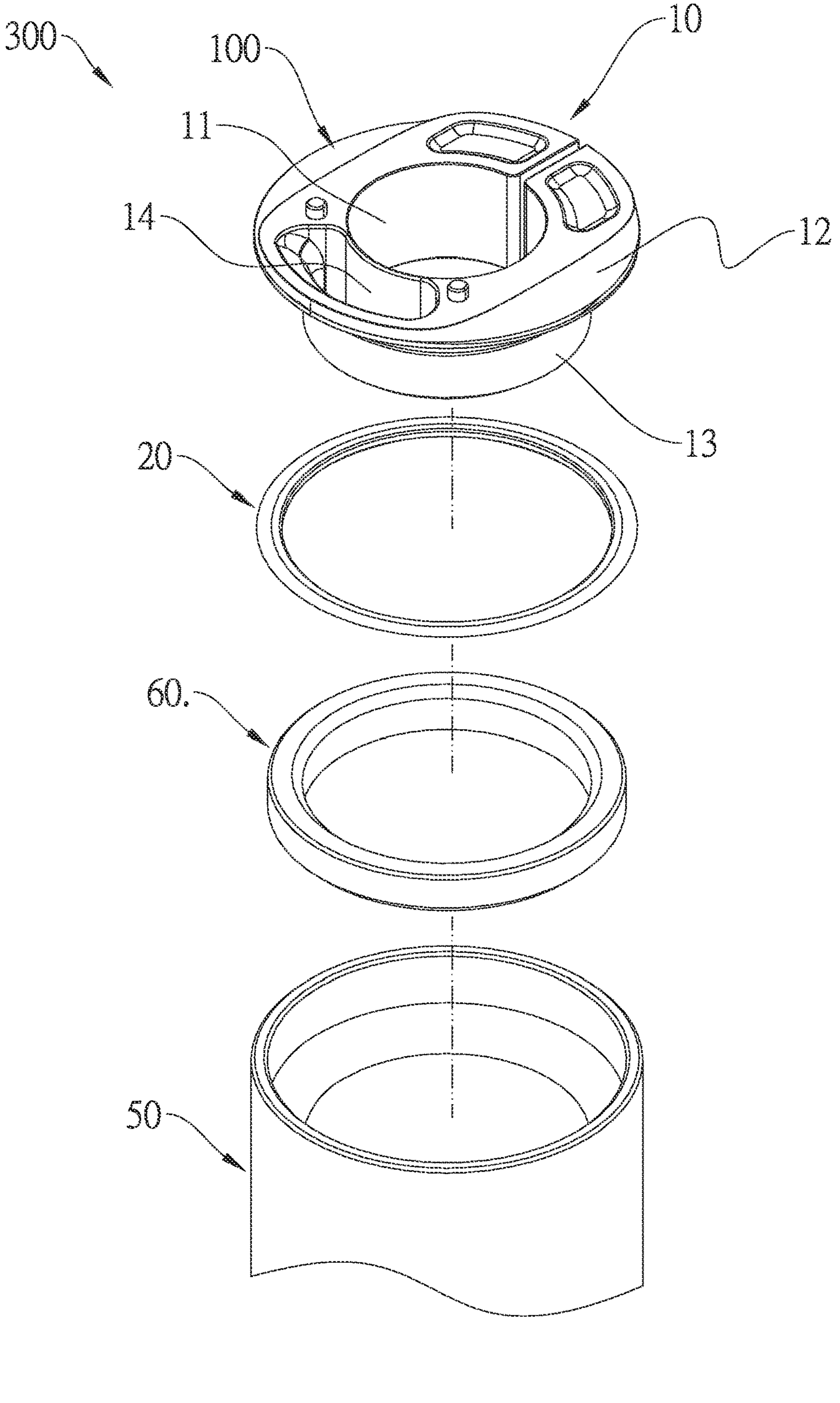
FIG. 17 is an exploded view of the bicycle frame according to the fourth embodiment of the present disclosure.

Furthermore, referring to FIG. 14, the first annular base **30*a*' has a first annular groove 391' surrounding between the first section 321' of the large-diameter portion 32' and the first connecting section 351'. The second annular base 30*b*' has a second annular groove 392' surrounding between the second section 322' of the large-diameter portion 32' and the second connecting section 352'. Referring to FIG. 11, FIG. 14, and FIG. 15, when the first annular base 30*a*' and the second annular base 30*b*' are engaged with each other, the first annular groove 391' and the second annular groove 392' communicate with each other to form an annular groove 39'. The sealing gasket 40' fits around the annular groove 39', thereby enhancing the engagement between the first annular base 30*a*' and the second annular base 30*b*'**.

In this way, the annular bodies 30, 30' of the compression rings 200, 200' in the second embodiment and in the third embodiment include the first annular bases **30*a*, 30*a*' and the second annular bases 30*b*, 30*b*' that could be detachably engaged with each other through different engaging structures; for example, in the second embodiment, the first annular base 30*a* and the second annular base 30*b* have the first hook portion 36 and the second hook portion 37, respectively, wherein the first hook portion 36 and the second hook portion 37 are stuck by each other, so that the first annular base 30*a* and the second annular base 30*b* are assembled to form the annular body 30; in the third embodiment, the first annular base 30*a*' and the second annular base 30*b*' have the two first engaging portions 36' and the two second engaging portions 37', respectively, wherein the two first engaging portions 36' matches with the two second engaging portions 37' in a convex-concave structure, so that the first annular base 30*a*' and the second annular base 30*b*' are assembled to form the annular body 30'; additionally, the large-diameter portions 32, 32' and the small-diameter portion 33, 33' of the annular body 30, 30'** are engaged to form a monolithic unit, which could also achieve the purpose of reducing the assembling cost and enhancing the efficiency of installing and routing the bicycle cable.

A bicycle frame 300 according to a fourth embodiment of the present disclosure is illustrated in FIG. 16 to FIG. 22 and includes a headtube 50, the compression ring 100, and a bearing 60. The bicycle frame 300 in the fourth embodiment includes the compression ring 100 in the first embodiment as an example for illustration.

Figure 18:
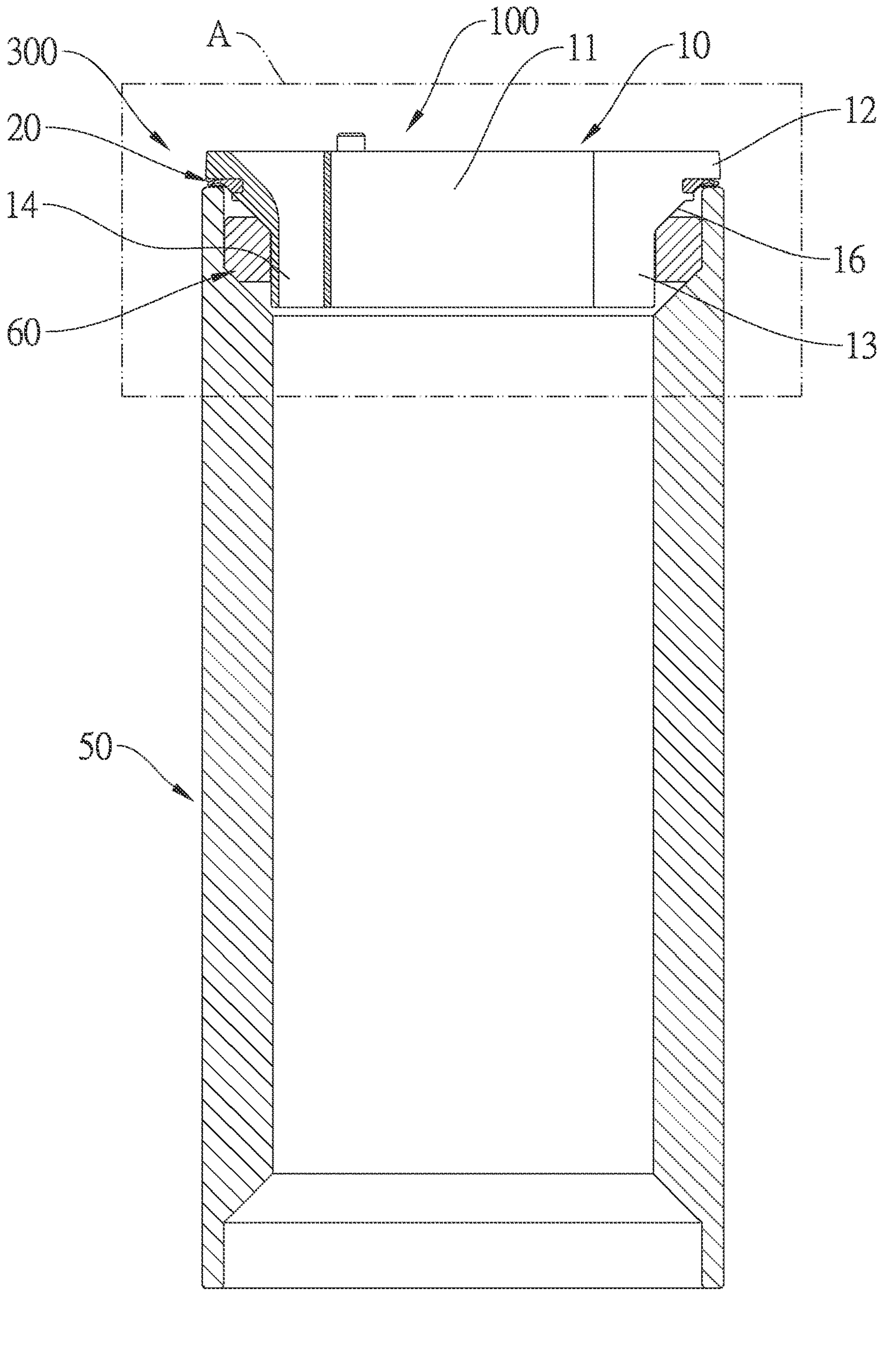
FIG. 18 is a schematic sectional view of the bicycle frame according to the fourth embodiment of the present disclosure.

The headtube 50 has two wide opening portions 51 and a narrow portion 52. As shown in FIG. 18, the two wide opening portions 51 are respectively located on two ends of the headtube 50. The narrow portion 52 is located between the two wide opening portions 51 and communicates with the two wide opening portions 51 along an axial direction of the headtube 50. Two abutting portions 53 are provided in the headtube 50 and are respectively located between the narrow portion 52 and one of the two abutting portions 53. The two abutting portions 53 are adapted to abut against the bearing 60. In the current embodiment, each of the abutting portions 53 is connected between one of the two wide opening portions 51 and the narrow portion 52; the narrow portion 52 extends from the two abutting portions 53 along the axial direction of the headtube 50.

In other embodiments, the number of the wide opening portion 51 could be one and could be provided on one of the two ends of the headtube 50, and the number of the abutting portion 53 corresponding to the wide opening portion 51 could be one. Additionally, in the current embodiment, the inner structures of the headtube 50 could be provided by a conventional headset bearing seat. In other embodiments, the headtube 50 could be replaced with a straight tube to omit the two wide opening portions 51 and the narrow portion 52 of the headtube 50, and the conventional headset bearing seat with the wide opening portion 51, the narrow portion 52, and the abutting portion 53 could be installed in the headtube 50 and could be adapted to abut against the bearing 60; in other words, the headtube 50 could only have an abutting portion 53 located in the headtube 50 to form a stop ring or located on an end surface of the headtube 50 to abut against the headset bearing seat, so that the bearing 60 could be installed on the headtube 50. As the structure and the engaging way of the headtube 50 being replaced with the straight tube are not obviously different from that of the headtube 50 illustrated in the current embodiment, the headtube 50 with the straight tube structure is not illustrated with drawings.

Figure 19:
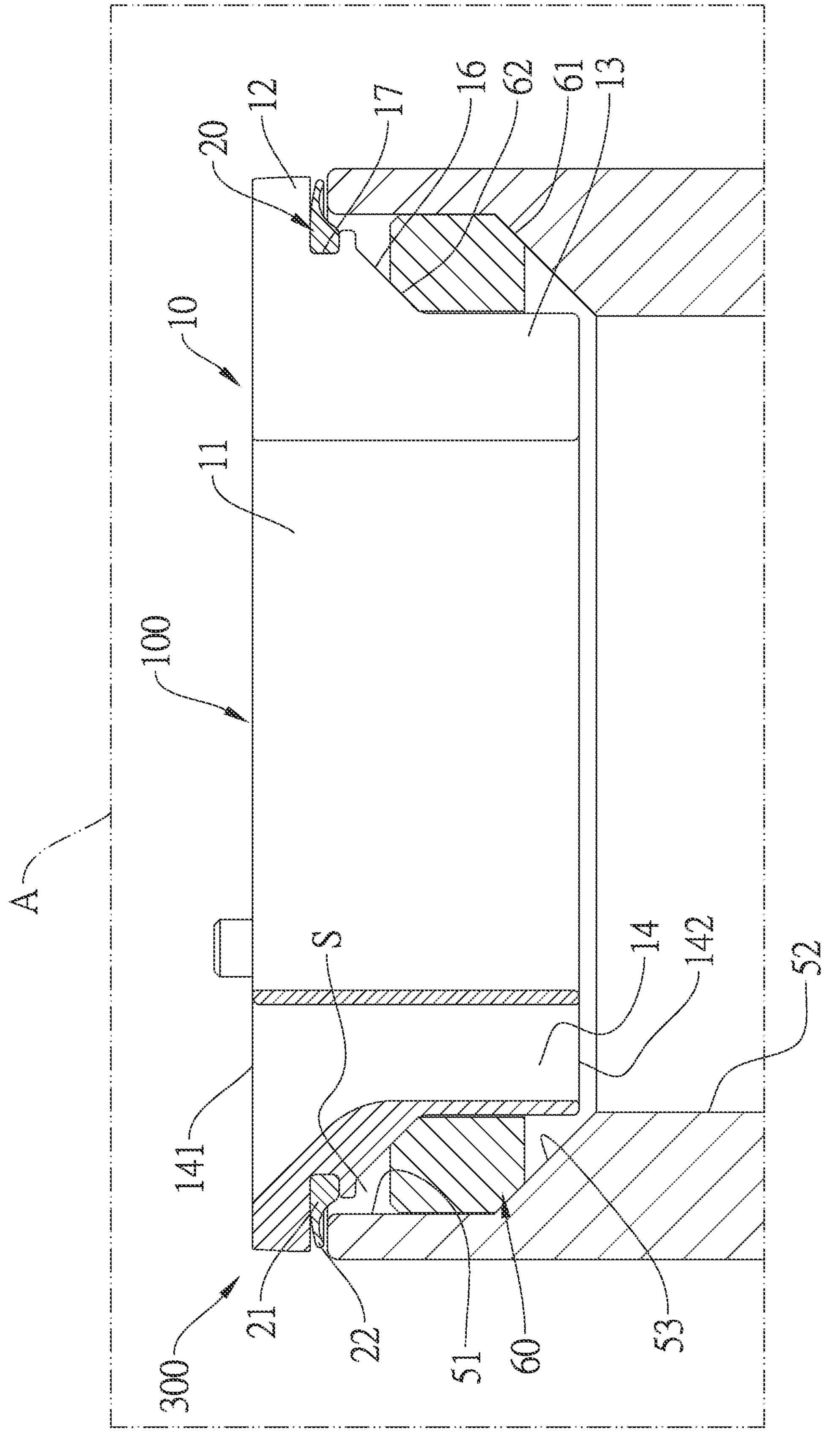
FIG. 19 is an enlarged schematic view of a marked region A in FIG. 18.

The compression ring 100 is disposed on an end of the headtube 50. The annular body 10 enters the headtube 50 through the small-diameter portion 13 and the connecting portion 16, wherein the small-diameter portion 13 and the connecting portion 16 are received in the wide opening portion 51. A space S is formed between a periphery of the small-diameter portion 13 and an inner wall of the wide opening portion 51. As an outer diameter of the large-diameter portion 12 is greater than a diameter of an end opening of the wide opening portion 51, the large-diameter portion 12 is located on an outside of the wide opening portion 51 and abuts against the headtube 50, and the cable guiding hole 14 communicates with the narrow portion 52 of the headtube 50. An outside of the annular body 10 has the annular groove 17 located between the connecting portion 16 and the large-diameter portion 12. The sealing gasket 20 fits around the annular groove 17 of the annular body 10 for fixing. As shown in FIG. 18 and FIG. 19, the sealing gasket 20 has a fitting portion 21 and an outer annular portion 22, wherein the fitting portion 21 is correspondingly received in the annular groove 17. The outer annular portion 22 surrounds a periphery of the fitting portion 21 and tightly abuts against a bottom edge of the large-diameter portion 12. When the annular body 10 is disposed on the headtube 50, the outer annular portion 22 of the sealing gasket 20 abuts against a peripheral edge of the end opening of the wide opening portion 51, so that a connecting gap between the annular body 10 and the headtube 50 could be sealed.

The bearing 60 is disposed in the headtube 50. The bearing 60 surrounds the small-diameter portion 13 of the annular body 10 and abuts against the abutting portion 53. Referring to FIG. 18 and FIG. 19, in the current embodiment, the bearing 60 has an outer abutting surface 61 and an inner abutting surface 62. The outer abutting surface 61 is located on an outer peripheral edge of the bearing 60. The outer abutting surface 61 is connected between an outside wall and a bottom surface of the bearing 60. The inner abutting surface 62 is located on an inner peripheral edge of the bearing 60. The inner abutting surface 62 is connected between an inside wall and a top surface of the bearing 60. The outer abutting surface 61 is opposite to the inner abutting surface 62. The bearing 60 is received in the wide opening portion 51 and the outer abutting surface 61 correspondingly abuts against the abutting portion 53. When the annular body 10 is installed on the wide opening portion 51, the connecting portion 16 and the small-diameter portion 13 are received in the wide opening portion 51, wherein the small-diameter portion 13 passes through an axial hole of the bearing 60 and the connecting portion 16 correspondingly abuts against the inner abutting surface 62 of the bearing 60, so that the bearing 60 fits around the connecting portion 16 and the periphery of the small-diameter portion 13 is fixed in the space S.

Figure 20:
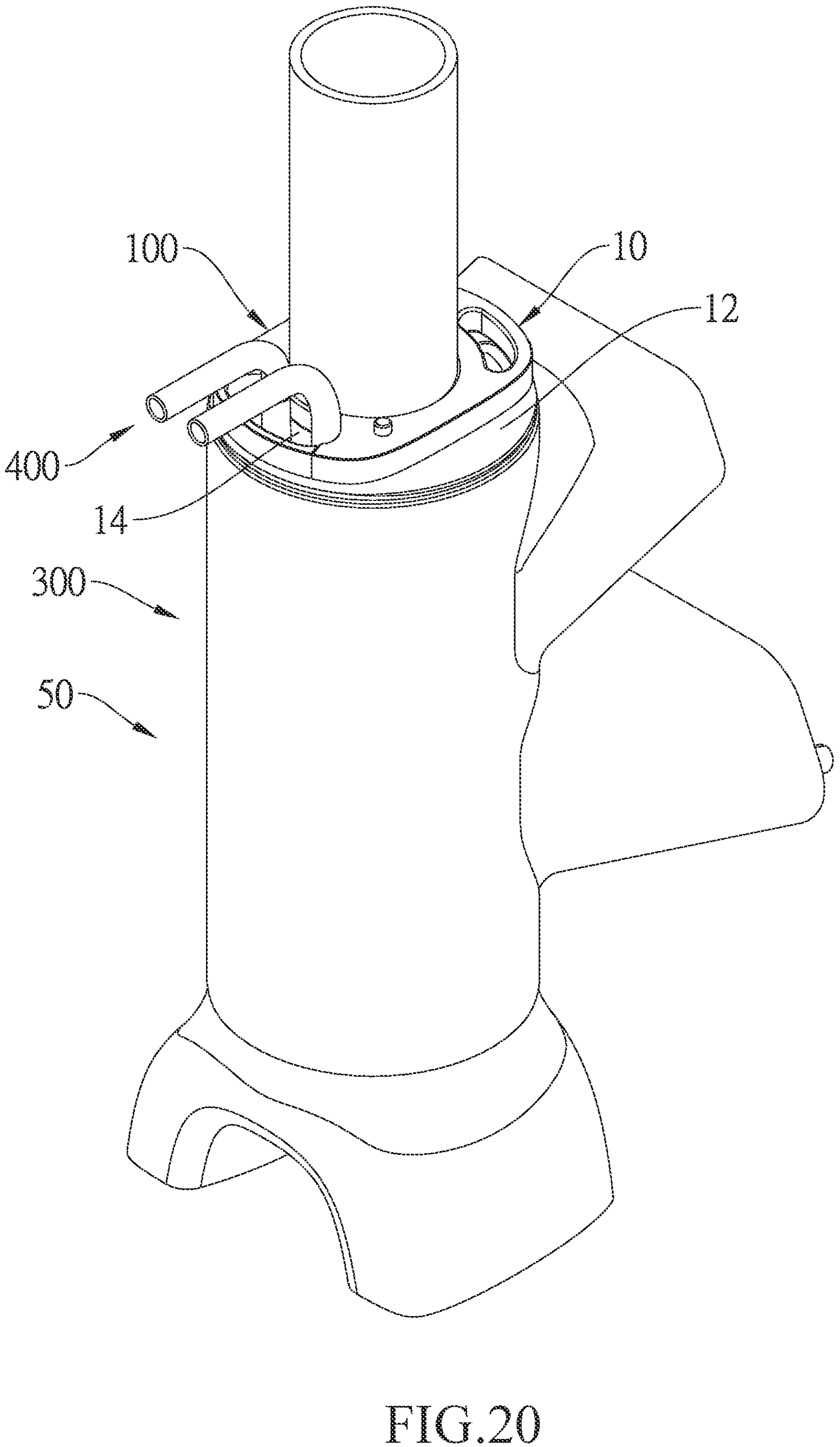
FIG. 20 is a perspective view, showing the bicycle cable being installed on the bicycle frame according to the fourth embodiment of the present disclosure.
Figure 21:
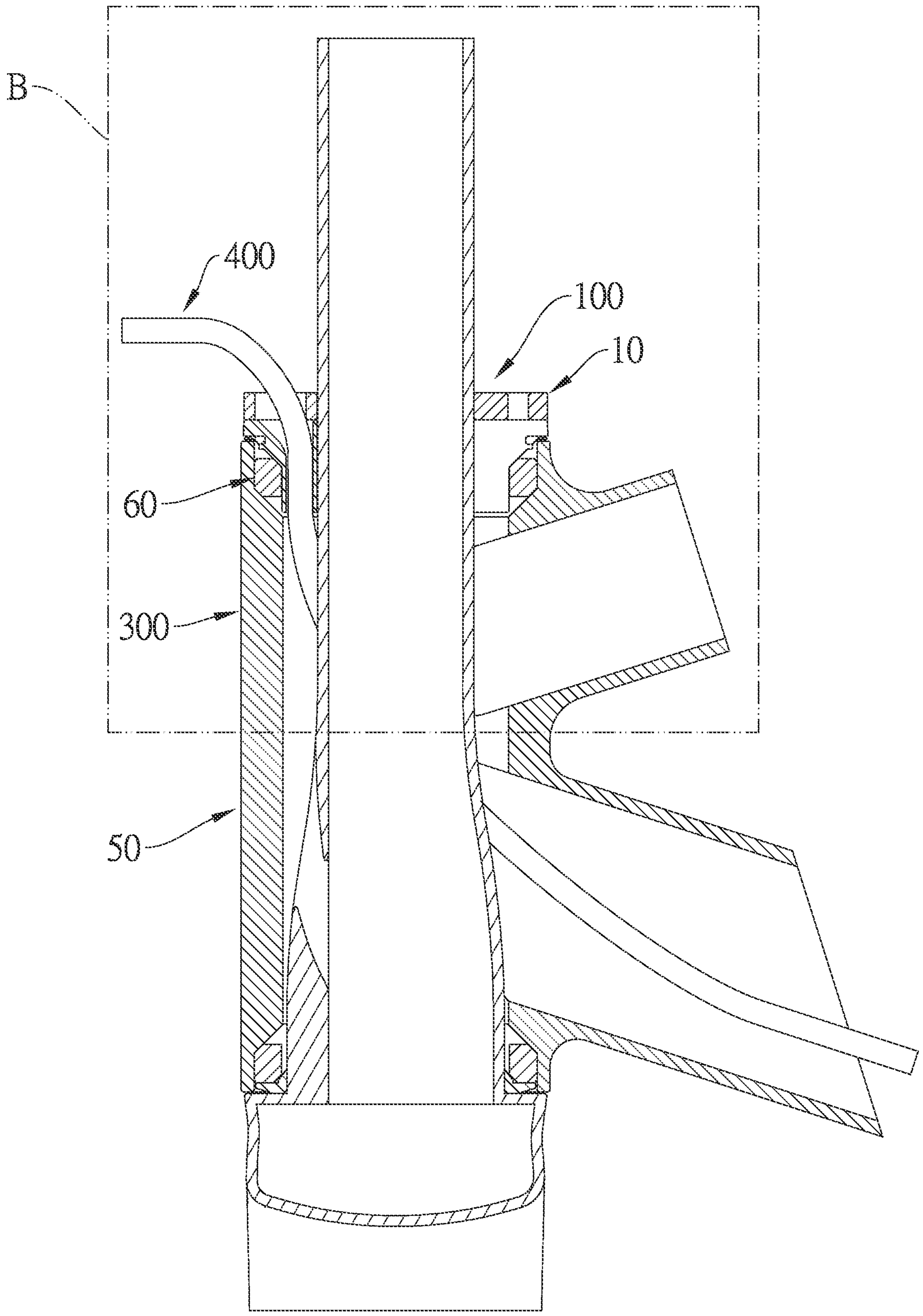
FIG. 21 is a schematic sectional view of FIG. 20.
Figure 22:
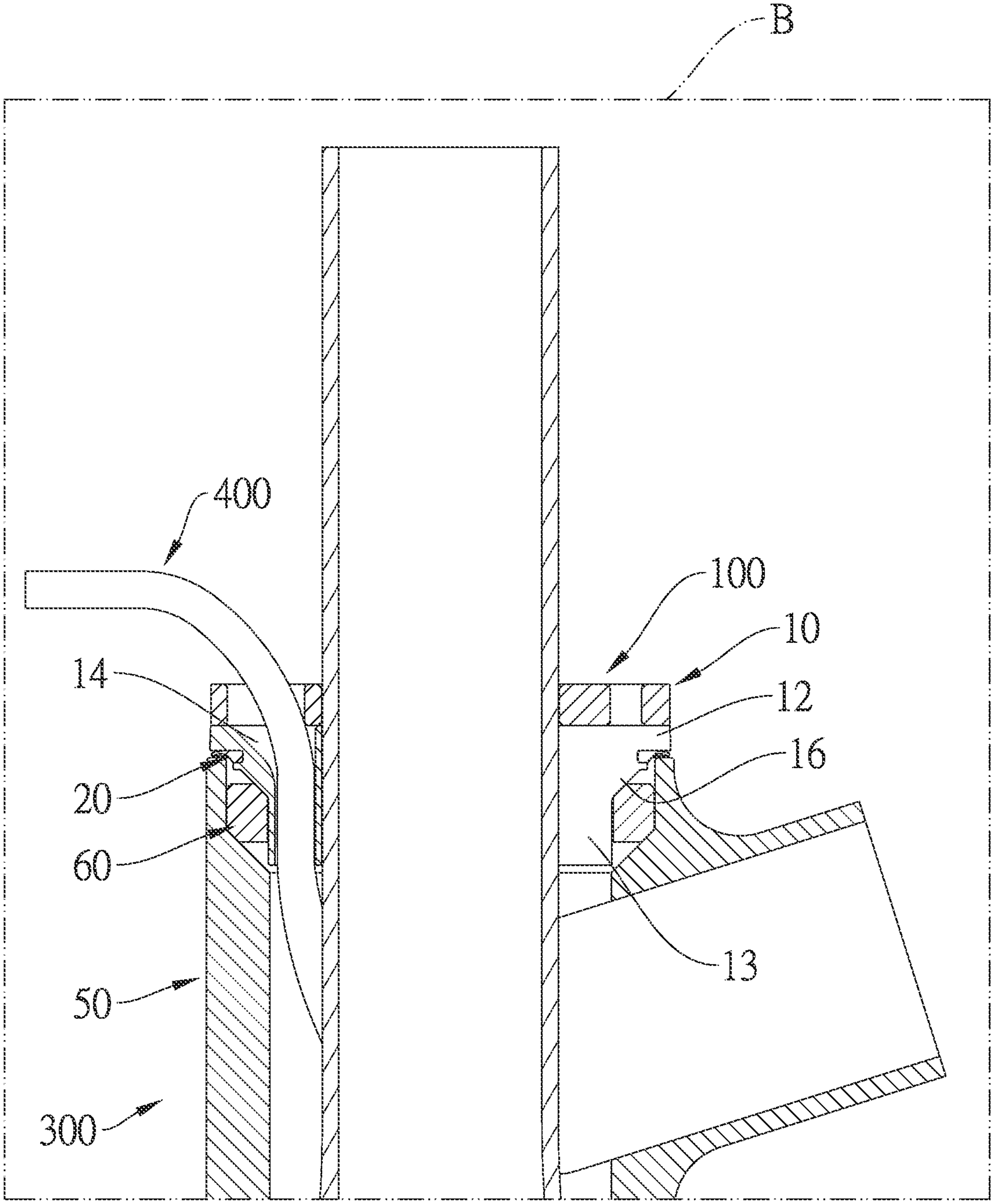
FIG. 22 is an enlarged schematic view of a marked region B in FIG. 22.

Referring to FIG. 20 to FIG. 22, when a bicycle cable 400 is installed and routed on the bicycle frame 300, the bicycle cable 400 is disposed inside the headtube 50. The bicycle cable 400 could firstly pass through the cable guiding hole 14 of the annular body 10. As the large-diameter portion 12 and the small-diameter portion 13 of the annular body 10 are connected with each other to form a monolithic unit, and the first cable hole 141 and the second cable hole 142 in the current embodiment shown in FIG. 19 are vertically aligned with each other along the cable guiding hole 14, the bicycle cable 400 could pass through the cable guiding hole 14 of the annular body 10. Then the annular body 10 could be directly disposed on the wide opening portion 51 of the headtube 50, wherein the small-diameter portion 13 and the connecting portion 16 enter the wide opening portion 51 of the headtube 50. The large-diameter portion 12 is located on the outside of the wide opening portion 51, and the outer annular portion 22 of the sealing gasket 20 abuts against the peripheral edge of the end opening of the wide opening portion 51. Thus, the connecting gap between the annular body 10 and the headtube 50 could be sealed.

In this way, when the bicycle cable 400 of the bicycle frame 300 is installed and routed, the bicycle cable 400 could smoothly pass through the cable guiding hole 14 of the annular body 10 due to the monolithic design of the large-diameter portion 12 and the small-diameter portion 13 of the annular body 10 of the compression ring 100. Then the annular body 10 is directly disposed on the wide opening portion 51 of the headtube 50, so that the compression ring 100 could be quickly installed on the headtube 50. Therefore, the assembling cost of aligning the components of the compression ring 100 could be reduced, so that the efficiency of installing and routing the bicycle cable 400 could be increased, thereby relieving the problem of cable routing of the conventional bicycle headset mechanism and being convenient in disassembling and replacing the compression ring 100.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A compression ring of a bicycle headset, comprising:

an annular body comprising a through hole, a large-diameter portion, and a small-diameter portion, wherein the large-diameter portion and the small-diameter portion surround the through hole and are connected with each other; the annular body has a cable guiding hole passing through the large-diameter portion and the small-diameter portion;

wherein a slot is provided on a side of the annular body and passes through the large-diameter portion and the small-diameter portion along an axial direction of the through hole; two free ends of the annular body are formed respectively on two sides of the slot; the through hole radially communicates with the slot;

wherein the annular body comprises a connecting portion and an annular groove; the connecting portion is located between the large-diameter portion and the small-diameter portion and is connected with the large-diameter portion and the small-diameter portion; the annular groove surrounds an outside of the annular body and is located between the connecting portion and the large-diameter portion; and wherein the compression ring further comprises a sealing gasket that fits around the annular groove for fixing; the sealing gasket has a fitting portion and an outer annular portion, wherein the fitting portion is correspondingly received in the annular groove; and the outer annular portion surrounds an outer periphery of the fitting portion and tightly abuts against a bottom edge of the large-diameter portion.

2. The compression ring as claimed in claim 1, wherein the sealing gasket passes across the slot.

3. The compression ring as claimed in claim 1, wherein the cable guiding hole passes through a top side surface of the large-diameter portion and a bottom side surface of the small-diameter portion along an axial direction of the through hole; a first cable hole of the cable guiding hole is formed on the top side surface of the large-diameter portion; a second cable hole of the cable guiding hole is formed on the bottom side surface of the small-diameter portion; an opening of the first cable hole is larger than an opening of the second cable hole.

4. The compression ring as claimed in claim 3, wherein the annular body has a notch passing through an inner wall of the through hole; the first cable hole and the second cable hole communicate with the notch; the notch is located between the cable guiding hole and the through hole.

5. A compression ring, comprising:

an annular body comprising a through hole, a large-diameter portion, and a small-diameter portion, wherein the large-diameter portion and the small-diameter portion surround the through hole and are connected with each other; the annular body has a cable guiding hole passing through the large-diameter portion and the small-diameter portion;

wherein the annular body comprises a connecting portion and an annular groove; the connecting portion is located between the large-diameter portion and the small-diameter portion and is connected with the large-diameter portion and the small-diameter portion; the annular groove surrounds an outside of the annular body and is located between the connecting portion and the large-diameter portion;

wherein the compression ring further comprises a sealing gasket that fits around the annular groove for fixing; the sealing gasket has a fitting portion and an outer annular portion, wherein the fitting portion is correspondingly received in the annular groove; and the outer annular portion surrounds an outer periphery of the fitting portion and tightly abuts against a bottom edge of the large-diameter portion;

wherein the annular body comprises a first annular base and a second annular base; the first annular base has a first engaging end, and the second annular base has a second engaging end, wherein the first engaging end and the second engaging end are correspondingly engaged with each other, allowing the first annular base and the second annular base to be detachably engaged with each other and to surround to form the through hole; and wherein the first annular base has a first free end opposite to the first engaging end; the second annular base has a second free end opposite to the second engaging end; when the first annular base and the second annular base are engaged with each other, a slot is formed to separate the first free end and the second free end and radially communicates with the through hole.

6. The compression ring as claimed in claim 5, wherein the large-diameter portion comprises a first section and a second section; the small-diameter portion comprises a first section and a second section; the first annular base has the first section of the large-diameter portion and the first section of the small-diameter portion, wherein the first section of the large-diameter portion and the first section of the small-diameter portion are connected with each other; the second annular base has the second section of the large-diameter portion and the second section of the small-diameter portion, wherein the second section of the large-diameter portion and the second section of the small-diameter portion are connected with each other; when the first annular base and the second annular base are engaged with each other, a part of an end surface of the first engaging end corresponding to the first section of the large-diameter portion faces and abuts against a part of an end surface of the second engaging end corresponding to the second section of the large-diameter portion, and another part of the end surface of the first engaging end corresponding to the first section of the small-diameter portion faces and abuts against another part of the end surface of the second engaging end corresponding to the second section of the small-diameter portion.

7. The compression ring as claimed in claim 6, wherein the first engaging end has a first hook portion; the first hook portion is recessed from a top side surface of the first annular base into a portion of the first section of the large-diameter portion to form a first groove opening upward, wherein a side of the first groove has a first positioning block; the second engaging end has a second hook portion; the second hook portion is recessed from a bottom side surface of the second annular base into a portion of the second section of the small-diameter portion to form a second groove opening downward, wherein a side of the second groove has a second positioning block; when the first hook portion is engaged with the second hook portion, the first positioning block is correspondingly engaged with the second groove, and the second positioning block is correspondingly engaged with the first groove; the first hook portion and the second hook portion are stuck by each other, assembling the first annular base and the second annular base to form the annular body.

8. The compression ring as claimed in claim 6, wherein the end surface of the first engaging end has at least one first engaging portion; the end surface of the second engaging end has at least one second engaging portion; the first engaging portion and the second engaging portion engage with each other in a concave-convex structure, assembling the first annular base and the second annular base to form the annular body.

9. A bicycle frame, comprising:

a headtube having an abutting portion;

the compression ring as claimed in claim 1, wherein the compression ring is disposed on an end of the headtube; the annular body enters the headtube through the small-diameter portion;

an outer diameter of the large-diameter portion is larger than a diameter of the headtube; the large-diameter portion abuts against an end opening of the headtube; the cable guiding hole communicates with the headtube; and a bearing disposed in the headtube, wherein the bearing surrounds the small-diameter portion of the annular body and abuts against the abutting portion.

10. The bicycle frame as claimed in claim 9, wherein the headtube has a wide opening portion and a narrow portion; the abutting portion is located between the wide opening portion and the narrow portion; the wide opening portion is located on the end of the headtube; the narrow portion extends from the abutting portion along an axial direction of the headtube; an outer peripheral edge of the bearing has an outer abutting surface; the bearing is received in the wide opening portion and the outer abutting surface correspondingly abuts against the abutting portion.

11. The bicycle frame as claimed in claim 10, wherein an inner peripheral edge of the bearing has an inner abutting surface; when the annular body is disposed on the headtube, the small-diameter portion and the connecting portion are received in the wide opening portion, wherein the small-diameter portion passes through an axial hole of the bearing and the connecting portion correspondingly abuts against the inner abutting surface of the bearing; a space is formed between a periphery of the small-diameter portion and an inner wall of the wide opening portion; the bearing fits around the connecting portion and the periphery of the small-diameter portion and is fixed in the space.

12. The bicycle frame as claimed in claim 11, wherein when the annular body is disposed on the headtube, the outer annular portion of the sealing gasket abuts against the end opening of the headtube.

13. A compression ring of a bicycle headset, comprising:

an annular body comprising a through hole, a large-diameter portion, and a small-diameter portion, wherein the large-diameter portion and the small-diameter portion surround the through hole and are connected with each other; the annular body has a cable guiding hole passing through the large-diameter portion and the small-diameter portion;

wherein the annular body comprises a first annular base and a second annular base; the first annular base has a first engaging end, and the second annular base has a second engaging end, wherein the first engaging end and the second engaging end are correspondingly engaged with each other, allowing the first annular base and the second annular base to be detachably engaged with each other and to surround to form the through hole;

wherein the first annular base has a first free end opposite to the first engaging end; the second annular base has a second free end opposite to the second engaging end; when the first annular base and the second annular base are engaged with each other, a slot is formed to separate the first free end and the second free end and radially communicates with the through hole;

wherein the large-diameter portion comprises a first section and a second section; the small-diameter portion comprises a first section and a second section; the first annular base has the first section of the large-diameter portion and the first section of the small-diameter portion, wherein the first section of the large-diameter portion and the first section of the small-diameter portion are connected with each other; the second annular base has the second section of the large-diameter portion and the second section of the small-diameter portion, wherein the second section of the large-diameter portion and the second section of the small-diameter portion are connected with each other; when the first annular base and the second annular base are engaged with each other, a part of an end surface of the first engaging end corresponding to the first section of the large-diameter portion faces and abuts against a part of an end surface of the second engaging end corresponding to the second section of the large-diameter portion, and another part of the end surface of the first engaging end corresponding to the first section of the small-diameter portion faces and abuts against another part of the end surface of the second engaging end corresponding to the second section of the small-diameter portion.

* * * * *